United States Patent
Yamamoto et al.

(10) Patent No.: US 10,228,632 B2
(45) Date of Patent: Mar. 12, 2019

(54) POWDER DETECTION DEVICE, IMAGE FORMING APPARATUS, POWDER DETECTION METHOD, AND NON-TRANSITORY RECORDING MEDIUM

(71) Applicants: Mitsufumi Yamamoto, Tokyo (JP); Tetsuro Hirota, Kanagawa (JP); Kenji Kikuchi, Kanagawa (JP); Kazuho Satoh, Kanagawa (JP); Shingo Nishizaki, Kanagawa (JP); Ko Tokumaru, Tokyo (JP)

(72) Inventors: Mitsufumi Yamamoto, Tokyo (JP); Tetsuro Hirota, Kanagawa (JP); Kenji Kikuchi, Kanagawa (JP); Kazuho Satoh, Kanagawa (JP); Shingo Nishizaki, Kanagawa (JP); Ko Tokumaru, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 164 days.

(21) Appl. No.: 15/158,357

(22) Filed: May 18, 2016

(65) Prior Publication Data
US 2016/0349101 A1 Dec. 1, 2016

(30) Foreign Application Priority Data
May 27, 2015 (JP) ................ 2015-107712

(51) Int. Cl.
*G01F 25/00* (2006.01)
*G03G 15/08* (2006.01)
*G01F 23/296* (2006.01)

(52) U.S. Cl.
CPC ....... *G03G 15/0856* (2013.01); *G03G 15/086* (2013.01); *G03G 15/0858* (2013.01); *G01F 23/2967* (2013.01); *G03G 2215/0132* (2013.01)

(58) Field of Classification Search
CPC ....... G01L 9/0022; G01L 9/008; G01L 11/04; G01L 9/0025; G01L 9/0008; G01F 25/0061; G01F 23/28; G03G 15/0831
(Continued)

(56) References Cited

U.S. PATENT DOCUMENTS

| | | | | |
|---|---|---|---|---|
| 4,441,044 A | * | 4/1984 | Ruckenbauer | G01L 23/10 310/329 |
| 4,991,153 A | * | 2/1991 | Tsuruoka | G01L 9/0022 310/348 |

(Continued)

FOREIGN PATENT DOCUMENTS

JP 2013-037280 2/2013

OTHER PUBLICATIONS

U.S. Appl. No. 14/958,090, filed Dec. 3, 2015.

*Primary Examiner* — Natalie Huls
*Assistant Examiner* — Mohammed E Keramet-Amircolai
(74) *Attorney, Agent, or Firm* — Duft & Bornsen, PC

(57) ABSTRACT

A powder detection device includes a detection mechanism including an oscillation unit and a vibrated member, a vibrating member, and a detection unit. The oscillation unit outputs a signal having a frequency according to a state of a magnetic flux passing a space facing the oscillation unit. The vibrated member affecting the magnetic flux and disposed inside a container to face the oscillation unit via the container is vibrated by the vibrating member in a direction of facing the oscillation unit. The detection unit acquires frequency information of the signal at predetermined periods, determines presence/absence of an error of the detection mechanism based on error information associating a type of the error with a state of the signal, detects vibration of the vibrated member based on a change in the frequency infor- (Continued)

mation, and detects a remaining amount of powder in the container based on the detected vibration.

20 Claims, 17 Drawing Sheets

(58) Field of Classification Search
USPC .................................................. 73/1.73, 702
See application file for complete search history.

(56) References Cited

U.S. PATENT DOCUMENTS

| | | | | |
|---|---|---|---|---|
| 4,995,263 A * | 2/1991 | Stocker | ................ | G01L 9/0022 310/338 |
| 6,573,836 B1 * | 6/2003 | Gitis | ........................ | B43M 7/00 340/540 |
| 7,528,606 B1 * | 5/2009 | In | ........................... | G01R 33/04 324/207.16 |
| 9,817,335 B2 * | 11/2017 | Kawashima | ....... | G03G 15/0858 |
| 2004/0177694 A1 * | 9/2004 | Harrold | .................. | G01L 11/04 73/702 |
| 2011/0043589 A1 * | 2/2011 | Hirota | ................ | G03G 15/0818 347/151 |
| 2011/0064432 A1 * | 3/2011 | Horike | ................. | G03G 15/065 399/44 |
| 2011/0176818 A1 * | 7/2011 | Yamamoto | ......... | G03G 15/0863 399/12 |
| 2011/0182626 A1 * | 7/2011 | Hirota | .................. | G03G 15/065 399/266 |
| 2011/0252884 A1 * | 10/2011 | Hanscombe | .......... | G01L 9/0008 73/32 A |
| 2012/0057891 A1 * | 3/2012 | Ishikura | ............. | G03G 15/0131 399/55 |
| 2012/0063797 A1 * | 3/2012 | Hirota | ................ | G03G 15/0818 399/55 |
| 2012/0063815 A1 * | 3/2012 | Seki | ..................... | G03G 15/065 399/265 |
| 2013/0216277 A1 * | 8/2013 | Endou | ................ | G03G 15/0818 399/284 |
| 2014/0270859 A1 * | 9/2014 | Hosokawa | ......... | G03G 15/0872 399/262 |
| 2015/0244894 A1 * | 8/2015 | Yamamoto | ............. | H04N 1/121 358/498 |
| 2016/0116860 A1 | 4/2016 | Hirota et al. | | |

* cited by examiner

| NUMBER n | 0 | 1 | 2 | 3 | 4 | 5 | 6 | 7 | 8 | 9 | 10 | 11 | |
|---|---|---|---|---|---|---|---|---|---|---|---|---|---|
| COUNT VALUE $S_n$ | 3400 | 3390 | 3360 | 3340 | 3310 | 3300 | 3310 | 3320 | 3350 | 3370 | 3380 | 3370 | ... |
| $S_{n-1}-S_n$ | − | + | + | + | + | + | − | − | − | − | − | + | |

FIG. 25

| OSCILLATION FREQUENCY f (MHz) | DETERMINATION RESULT |
|---|---|
| 0 (HIGH) | CONNECTOR DISCONNECTION, OSCILLATOR CIRCUIT FAILURE |
| 0 (LOW) | HARNESS GROUND FAULT, OSCILLATOR CIRCUIT FAILURE |
| f < 2.9 | INCORRECT SENSOR TYPE |
| 2.9 ≤ f < 3.1 | POOR ASSEMBLY |
| 3.1 ≤ f < 3.4 | NORMAL |
| 3.4 ≤ f < 3.6 | POOR ASSEMBLY |
| 3.6 ≤ f | INCORRECT SENSOR TYPE |
| ... | |

FIG. 26

| RESULT OF VIBRATION DETECTION | DETERMINATION RESULT |
|---|---|
| VIBRATION OF DIAPHRAGM DETECTED | NORMAL |
| VIBRATION OF DIAPHRAGM UNDETECTED | MYLAR DAMAGE, DIAPHRAGM DAMAGE, TONER CLOGGING, MOTOR FAILURE, TORQUE ERROR ... |

| | $vf < TH_2$ | $TH_2 \leq vf < TH_1$ | $TH_1 \leq vf$ |
|---|---|---|---|
| SUFFICIENT TONER | DIAPHRAGM FAILURE (TONER ADHERENCE), TONER ERROR | NORMAL | DIAPHRAGM FAILURE (LOSS OF COMPONENT), TONER ERROR |
| INSUFFICIENT TONER | DIAPHRAGM FAILURE (TONER ADHERENCE) | NORMAL | DIAPHRAGM FAILURE (LOSS OF COMPONENT) |

| FIG. 31A |
| FIG. 31B |

POWDER DETECTION DEVICE, IMAGE FORMING APPARATUS, POWDER DETECTION METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2015-107712 filed on May 27, 2015, in the Japan Patent Office, the entire disclosure of which is hereby incorporated by reference herein.

BACKGROUND

Technical Field

This disclosure relates to a powder detection device, an image forming apparatus, a powder detection method, and a non-transitory recording medium.

Related Art

With digitization of information promoted in recent years, an image forming apparatus, such as a printer or a facsimile machine used to output digitized information or a scanner used to digitize documents, has been widely used. As a system for forming and outputting an image employed in such an image forming apparatus, an electrophotographic system has been used which forms and output an image by forming an electrostatic latent image on a photoconductor, developing the electrostatic latent image, and transferring the developed image onto a sheet.

In the electrophotographic image forming apparatus, a developer is supplied from a container serving as a source of supply of the developer to a developing device that develops the electrostatic latent image formed on the photoconductor. The image forming apparatus detects the remaining amount of the thus-supplied developer.

SUMMARY

In one embodiment of this disclosure, there is provided an improved powder detection device that includes, for example, a detection mechanism, a vibrating member, and a detection unit. The detection mechanism includes an oscillation unit and a vibrated member. The oscillation unit outputs an oscillation signal having a frequency according to a state of a magnetic flux passing through a space faced by the oscillation unit. The vibrated member is made of a material affecting the magnetic flux, and is disposed inside a container to face the oscillation unit via a housing forming the container. The vibrating member vibrates the vibrated member in a direction of facing the oscillation unit. The detection unit acquires signal frequency-related information related to the frequency of the oscillation signal of the oscillation unit at predetermined periods, determines presence or absence of an error of the detection mechanism based on error determination information, detects vibration of the vibrated member based on a change in the signal frequency-related information according to the vibration of the vibrated member, and detects a remaining amount of flowable powder in the container based on the detected vibration. The error determination information associates a type of the error of the detection mechanism with a state of the oscillation signal obtained based on the signal frequency-related information.

In one embodiment of this disclosure, there is provided an improved image forming apparatus that includes, for example, the above-described powder detection device to detect a remaining amount of a developer.

In one embodiment of this disclosure, there is provided an improved powder detection method that includes, for example, acquiring, at predetermined periods, signal frequency-related information related to a frequency of an oscillation signal from an oscillation unit, the frequency according to a state of a magnetic flux passing through a space faced by the oscillation unit, determining, based on error determination information, presence or absence of an error of a detection mechanism including the oscillation unit and a vibrated member, the error determination information associating a type of the error of the detection mechanism with a state of the oscillation signal obtained based on the signal frequency-related information, detecting vibration of the vibrated member in a direction of facing the oscillation unit based on a change in the signal frequency-related information according to the vibration of the vibrated member, and detecting a remaining amount of flowable powder in a container based on the detected vibration of the vibrated member.

In one embodiment of this disclosure, there is provided a non-transitory recording medium storing a program for causing a computer to execute the above-described powder detection method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 25 is a table illustrating signal frequency information as an example of error determination information according to the embodiment;

FIG. 26 is a table illustrating vibration information as an example of the error determination information according to the embodiment;

Figure 1:
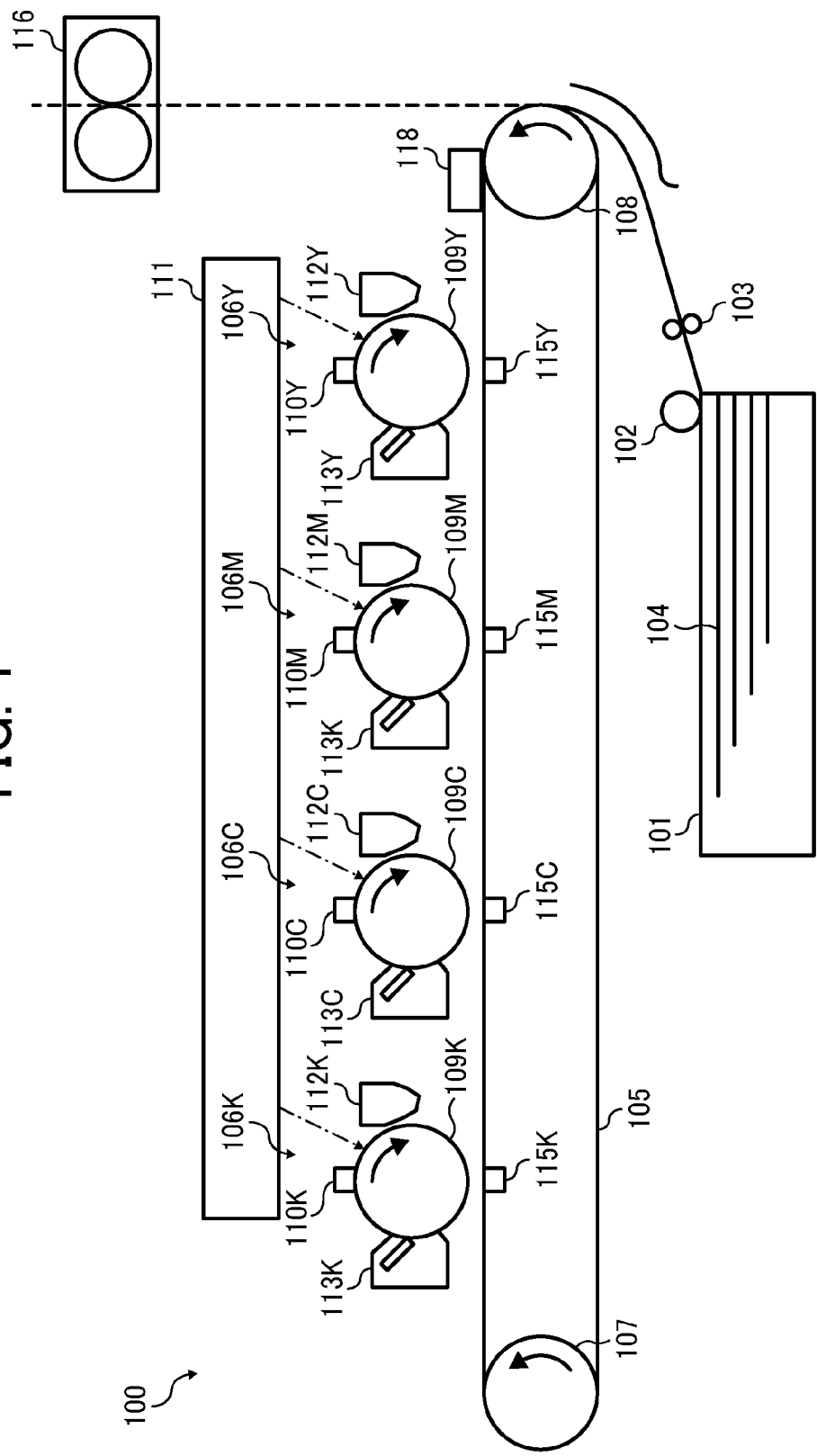
FIG. 1 is a diagram illustrating a mechanical configuration of an image forming apparatus including a developing device equipped with a magnetic flux sensor according to an embodiment of this disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, embodiments of this disclosure will be described in detail. The following description will be given of an example in which an electrophotographic image forming apparatus according to an embodiment of this disclosure detects a toner remaining amount in a sub-hopper, which stores toner between a developing device that develops an electrostatic latent image formed on a photoconductor and a container serving as a source of supply of the toner serving as a developer. An error detection method employed in such a mechanism for detecting the toner remaining amount will also be described.

FIG. 1 is a side view illustrating a mechanism of an image forming apparatus 100 according to the embodiment for forming and outputting an image. As illustrated in FIG. 1, the image forming apparatus 100 according to the embodiment is a so-called tandem image forming apparatus including a plurality of image forming units 106Y, 106M, 106C, and 106K for yellow (Y), magenta (M), cyan (C), and black (K) colors aligned along a transport belt 105 serving as an endless moving member. That is, the image forming units 106Y, 106M, 106C, and 106K (hereinafter occasionally collectively referred to as the image forming units 106) serving as electrophotographic processing units are sequentially arranged from the upstream side in a transport direction of the transport belt 105 along the transport belt 105, which is an intermediate transfer belt onto which an intermediate transfer image is formed and from which the intermediate transfer image is transferred onto a sheet 104 separated from other sheets and fed from a sheet feeding tray 101 by a sheet feeding roller 102.

The sheet 104 as an example of a recording medium is fed from the sheet feeding tray 101, temporarily stopped by registration rollers 103, and sent to an intermediate image transfer position, at which the sheet 104 faces the transport belt 105, at an appropriate time in accordance with the formation of images in the image forming units 106.

The image forming units 106Y, 106M, 106C, and 106K have the same internal configuration except for differences in color of toner images formed therein. The image forming units 106Y, 106M, 106C, and 106K form yellow, magenta, cyan, and black images, respectively.

A detailed description will be given below of the image forming unit 106Y. Since the other image forming units 106M, 106C, and 106K are similar to the image forming unit 106Y, as described above, components of the image forming units 106M, 106C, and 106K in the drawing are assigned with the reference numerals of those of the image forming unit 106Y with a suffix Y replaced with suffixes M, C, and K as appropriate, and description thereof will be omitted.

The transport belt 105 is an endless belt stretched around a driven roller 108 and a drive roller 107 that is driven to rotate by a drive motor. The drive motor, the drive roller 107, and the driven roller 108 cooperate as a driving unit that moves the transport belt 105 serving as the endless moving member.

In the image formation, the first image forming unit 106Y transfers the yellow toner image onto the transport belt 105 driven to rotate. The image forming unit 106Y includes a photoconductor drum 109Y serving as a photoconductor, and a charger 110Y, an optical writing device 111, a developing device 112Y, a photoconductor cleaner 113Y, and a discharger disposed around the photoconductor drum 109Y. The optical writing device 111 irradiates the photoconductor drums 109Y and the other photoconductor drums 109M, 109C, and 109K (hereinafter occasionally collectively referred to as the photoconductor drums 109) with light.

In the image formation, the outer circumferential surface of the photoconductor drum 109Y is uniformly charged by the charger 110Y in the dark, and then is subjected to optical writing with light from a light source in the optical writing device 111 corresponding to the yellow image. Thereby, an electrophotographic latent image is formed on the outer circumferential surface of the photoconductor drum 109Y. The electrophotographic latent image is then developed into a visible image with yellow toner by the developing device 112Y, thereby forming a yellow toner image on the photoconductor drum 109Y.

The yellow toner image is transferred onto the transport belt 105 with a transfer device 115Y at an image transfer position, at which the photoconductor drum 109Y and the transport belt 105 are in contact with or closest to each other. With this transfer process, the yellow toner image is formed on the transport belt 105. After the transfer of the yellow toner image, residual toner remaining on the outer circumferential surface of the photoconductor drum 109Y is removed by the photoconductor cleaner 113Y. The photoconductor drum 109Y is then discharged by the discharger, and stands by for the next image forming operation.

The yellow toner image thus transferred to the transport belt 105 by the image forming unit 106Y is then transported to the next image forming unit 106M by the transport belt 105 driven by the drive roller 107 and the driven roller 108. In the image forming unit 106M, a magenta toner mage is formed on the photoconductor drum 109M through an image forming process similar to that in the image forming unit 106Y, and then is superimposed and transferred onto the already formed yellow toner image.

The yellow and magenta toner images transferred to the transport belt 105 are then transported to the subsequent image forming units 106C and 106K, and cyan and black toner images formed on the photoconductor drums 109C and 109K, respectively, are superimposed and transferred onto the already transferred yellow and magenta toner images through an operation similar to that described above. Thereby, a full-color intermediate transfer image is formed on the transport belt 105.

Sheets 104 stored in the sheet feeding tray 101 are sequentially sent out from the uppermost sheet 104. The intermediate transfer image formed on the transport belt 105 is transferred onto the sheet 104 at the intermediate image transfer position, at which the transport belt 105 is in contact with or closest to a transport path of the sheet 104. Thereby, an image is formed on a surface of the sheet 104. The sheet 104 having the image formed on the surface thereof is further transported to a fixing device 116 to fix the image thereon. The sheet 104 with the image fixed thereon is ejected to the outside of the image forming apparatus 100.

The transport belt 105 is provided with a belt cleaner 118, which is a cleaning blade pressed against the transport belt 105 at a position downstream of the intermediate image transfer position for transferring the intermediate transfer image onto the sheet 104 from the transport belt 105 and upstream of the photoconductor drums 109 in the sheet transport direction, as illustrated in FIG. 1. The belt cleaner 118 serves as a developer removing unit that scrapes off toner (i.e., developer) adhering to the outer circumferential surface of the transport belt 105.

A configuration for supplying toner to the developing devices 112Y, 112M, 112C, and 112K (hereinafter occasionally collectively referred to as the developing devices 112) will now be described with reference to FIG. 2.

Figure 2:
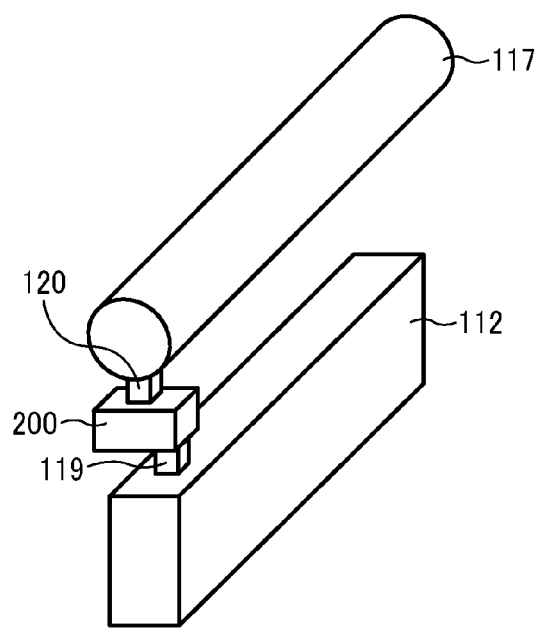
FIG. 2 is a perspective view illustrating a configuration for supplying toner according to the embodiment.

Since the configuration for supplying toner is basically similar for the yellow, magenta, cyan, and black colors, FIG. 2 illustrates a toner supply configuration for one of the developing devices 112. Toner is stored in a toner bottle 117 and supplied therefrom to a sub-hopper 200 through a toner bottle supply path 120, as illustrated in FIG. 2.

The sub-hopper 200 temporarily stores the toner supplied from the toner bottle 117, and supplies the toner to the developing device 112 through a sub-hopper supply path 119 in accordance with the toner remaining amount in the developing device 112. According to the embodiment, a state is detected in which the amount of toner in the sub-hopper 200 is reduced with the supply of toner to the sub-hopper 200 stopped due to the shortage of toner in the tonner bottle 117.

Figure 3:
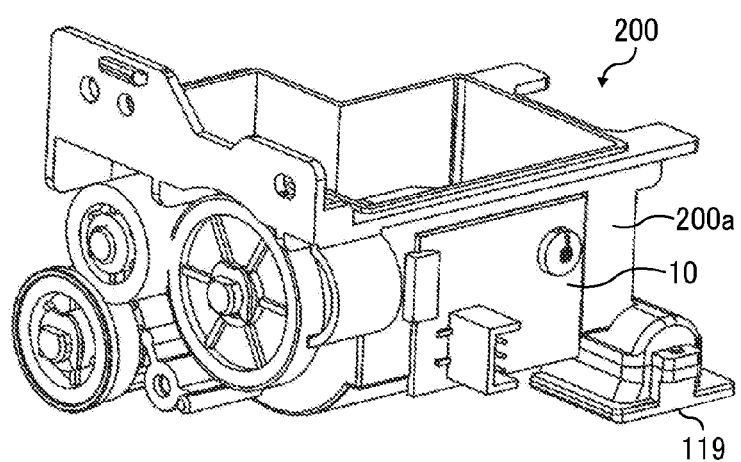
FIG. 3 is a perspective view illustrating an overview of a sub-hopper according to the embodiment.

FIG. 3 is a perspective view illustrating an overview of the sub-hopper 200 according to the embodiment. As illustrated in FIG. 3, a magnetic flux sensor 10 is attached to an outer wall of a housing 200a forming the sub-hopper 200. In FIG. 3, the sub-hopper 200 has an open upper portion, to which a cover formed with the toner bottle supply path 120 is attached. The toner stored in the sub-hopper 200 is supplied to the developing device 112 through the sub-hopper supply path 119 illustrated in FIG. 3.

Figure 4:
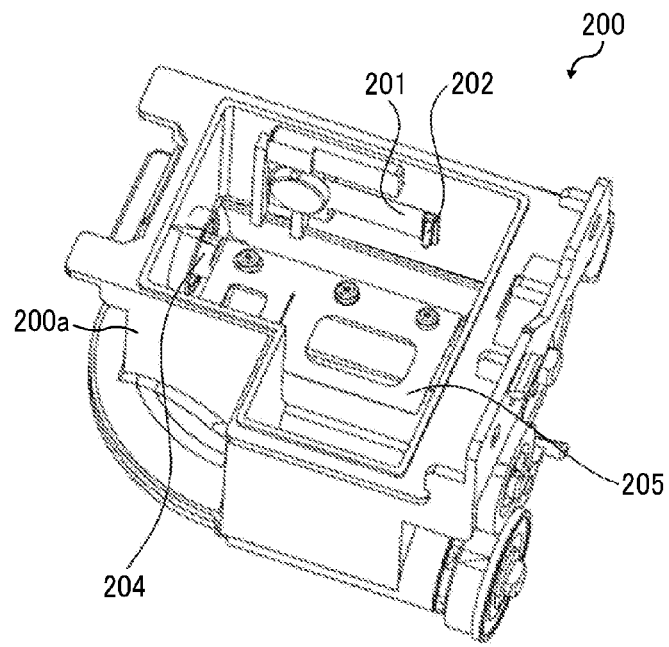
FIG. 4 is a perspective view illustrating the overview of the sub-hopper according to the embodiment.

FIG. 4 is a perspective view illustrating the interior of the sub-hopper 200. As illustrated in FIG. 4, a diaphragm 201 is provided to an inner wall inside the sub-hopper 200. The inner wall provided with the diaphragm 201 is on the back of the outer wall attached with the magnetic flux sensor 10 in FIG. 3. The diaphragm 201 is therefore disposed to face the magnetic flux sensor 10 via the housing 200a of the sub-hopper 200.

The diaphragm 201 is a rectangular plate-shaped member cantilevered with one end portion in the longitudinal direction fixed to the housing 200a of the sub-hopper 200. The other end portion in the longitudinal direction of the diaphragm 201 is unfixed and attached with a weight 202. The weight 202 has a function of vibrating the diaphragm 201 and a function of adjusting the vibration frequency of the vibrated diaphragm 201.

A rotary shaft 204 and a stirring member 205 are provided inside the sub-hopper 200 as a configuration for stirring the toner inside the sub-hopper 200. The rotary shaft 204 rotates inside the sub-hopper 200. The stirring member 205 is fixed to the rotary shaft 204, and rotates with the rotation of the rotary shaft 204 to stir the toner inside the sub-hopper 200.

In addition to the function of stirring the toner, the stirring member 205 further has a function of flipping the weight 202 provided to the diaphragm 201 with the rotation thereof. In each rotation of the stirring member 205, therefore, the weight 202 is flipped to vibrate the diaphragm 201. That is, the diaphragm 201 functions as a vibrated member, and the stirring member 205 functions as a vibrating member. According to the embodiment, the vibration of the diaphragm 201 is detected to detect the toner remaining amount in the sub-hopper 200.

An internal configuration of the magnetic flux sensor 10 according to the embodiment will now be described with reference to FIG. 5.

Figure 5:
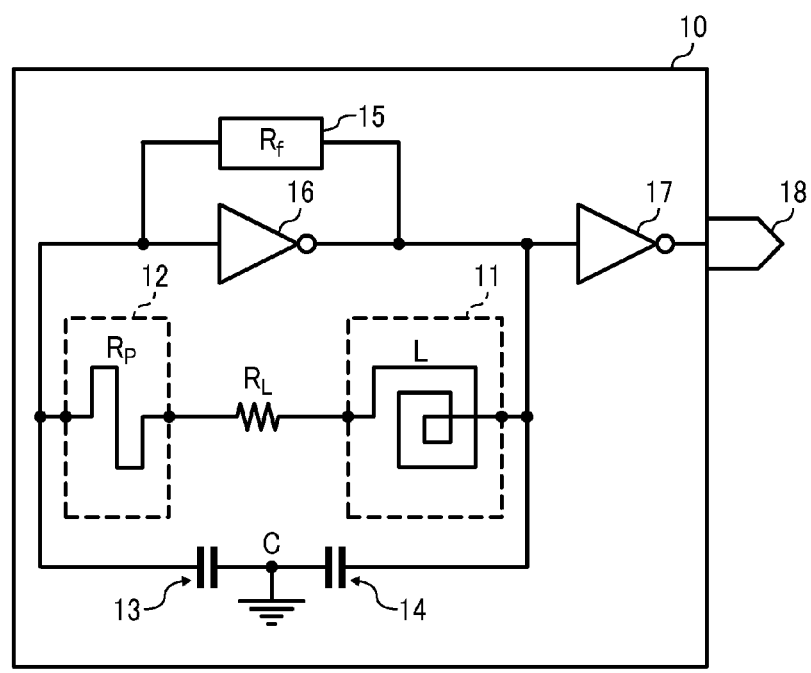
FIG. 5 is a diagram illustrating a circuit configuration of the magnetic flux sensor according to the embodiment.

As illustrated in FIG. 5, the magnetic flux sensor 10 according to the embodiment is basically a Colpitts inductance-capacitance (LC) oscillator circuit including a planar pattern coil 11, a pattern resistor 12, a first capacitor 13, a second capacitor 14, a feedback resistor 15, unbuffered integrated circuits (ICs) 16 and 17, and an output terminal 18.

The planar pattern coil 11 is a planar coil formed of a signal line patterned in a planar spiral shape on a substrate forming the magnetic flux sensor 10. As illustrated in FIG. 5, the planar pattern coil 11 has an inductance L obtained thereby. The value of the inductance L of the planar pattern coil 11 is changed by a magnetic flux passing through a space facing the surface of the substrate formed with the planar pattern coil 11. Accordingly, the magnetic flux sensor 10 according to the embodiment is used as an oscillation unit that oscillates to generate an oscillation signal having an oscillation frequency according to the magnetic flux passing through the space faced by a surface of the planar pattern coil 11.

The pattern resistor 12 is formed of a signal line patterned in a planar shape on the substrate of the magnetic flux sensor 10, similarly to the planar pattern coil 11. The pattern resistor 12 according to the embodiment has a zigzag pattern that makes current less likely to flow than a linear pattern, i.e., a pattern obtained by bending and folding the signal line to go back and forth multiple times relative to a predetermined direction. As illustrated in FIG. 5, the pattern resistor 12 has a resistance value $R_P$, and the planar pattern coil 11 and the pattern resistor 12 are connected in series.

The first capacitor 13 and the second capacitor 14 have capacitance C for forming the Colpitts LC oscillator circuit together with the inductance L of the planar pattern coil 11. The first capacitor 13 and the second capacitor 14 are therefore connected in series to the planar pattern coil 11 and the pattern resistor 12. The planar pattern coil 11, the pattern resistor 12, the first capacitor 13, and the second capacitor 14 form a resonant current loop.

The feedback resistor 15 having a resistance value $R_f$ is inserted in the circuit to stabilize a bias voltage. With the unbuffered ICs 16 and 17, fluctuations in the potential of a part of the resonant current loop are output from the output terminal 18 as a rectangular wave according to the resonant frequency.

With the above-described configuration, the magnetic flux sensor 10 according to the embodiment oscillates at an oscillation frequency f according to the inductance L, the resistance value $R_P$, a circuit resistance value $R_L$, and the capacitance C of the first capacitor 13 and the second capacitor 14. The oscillation frequency f is expressed by the following equation (1):

$$f = \frac{1}{2\pi}\sqrt{\frac{1}{LC} - \left(\frac{R_L + R_P}{2L}\right)^2} \quad (1)$$

The inductance L also changes depending on the presence and density of a magnetic substance near the planer pattern coil 11, which allows the magnetic permeability in a space near the planer pattern coil 11 to be determined based on the oscillation frequency f of the magnetic flux sensor 10.

Further, the magnetic flux sensor 10 attached to the sub-hopper 200 according to the embodiment is disposed facing the diaphragm 201 via the housing 200a of the sub-hopper 200, as described above. The magnetic flux generated by the planar pattern coil 11 therefore passes through the diaphragm 201. That is, the diaphragm 201 affects the magnetic flux generated by the planar pattern coil 11, and also affects the inductance L. Consequently, the presence of the diaphragm 201 affects the oscillation frequency f of the oscillation signal of the magnetic flux sensor 10, as described in detail later.

Figure 6:
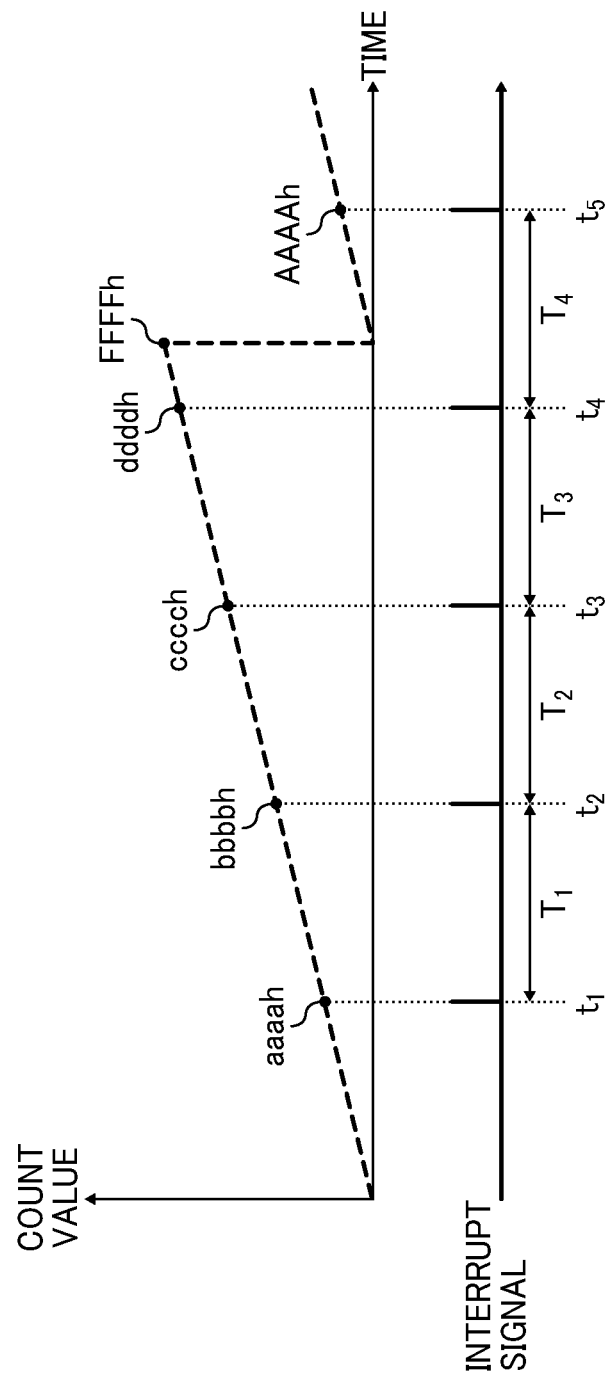
FIG. 6 is a graph illustrating an embodiment of counting an oscillation signal output from the magnetic flux sensor according to the embodiment.

FIG. 6 is a graph illustrating an embodiment of the count value of the oscillation signal output from the magnetic flux sensor 10 according to the embodiment. If there is no change in the magnetic flux generated by the planar pattern coil 11 included in the magnetic flux sensor 10, the magnetic flux sensor 10 basically continues to oscillate at the same oscillation frequency f. Consequently, the count value of a counter in the magnetic flux sensor 10 uniformly increases over time, and count values aaaah, bbbbh, ccch, ddddh, and AAAAh are acquired at times $t_1$, $t_2$, $t_3$, $t_4$, and $t_5$, respectively, as illustrated in FIG. 6.

The count values aaaah, bbbbh, ccch, ddddh, and AAAAh at the times $t_1$, $t_2$, $t_3$, $t_4$, and $t_5$ are calculated based on periods $T_1$, $T_2$, $T_3$ and $T_4$ illustrated in FIG. 6 to calculate the oscillation frequency f in each of the periods $T_1$, $T_2$, $T_3$ and $T_4$. For example, if the interrupt signal is output and the oscillation frequency f is calculated when a reference clock corresponding to 2 milliseconds is counted, the count value in each of the periods $T_1$, $T_2$, $T_3$ and $T_4$ is divided by 2 (milliseconds) to calculate the oscillation frequency f (Hz) of the magnetic flux sensor 10 in each of the periods $T_1$, $T_2$, $T_3$ and $T_4$.

If the upper limit of the count value of the counter is FFFFh, as illustrated in FIG. 6, the oscillation frequency f (Hz) in the period $T_4$ may be calculated by subtracting ddddh from FFFFf and dividing the sum of the difference of the subtraction and the value of AAAAh by 2 (milliseconds).

As described above, the image forming apparatus 100 according to the embodiment acquires the oscillation frequency f of the oscillation signal generated by the magnetic flux sensor 10, and determines a phenomenon corresponding to the oscillation frequency f of the magnetic flux sensor 10 based on the acquired oscillation frequency f. Further, in the magnetic flux sensor 10 according to the embodiment, the inductance L changes in accordance with the state of the diaphragm 201 disposed facing the planar pattern coil 11, thereby changing the oscillation frequency f of the oscillation signal output from the output terminal 18.

Figure 8:
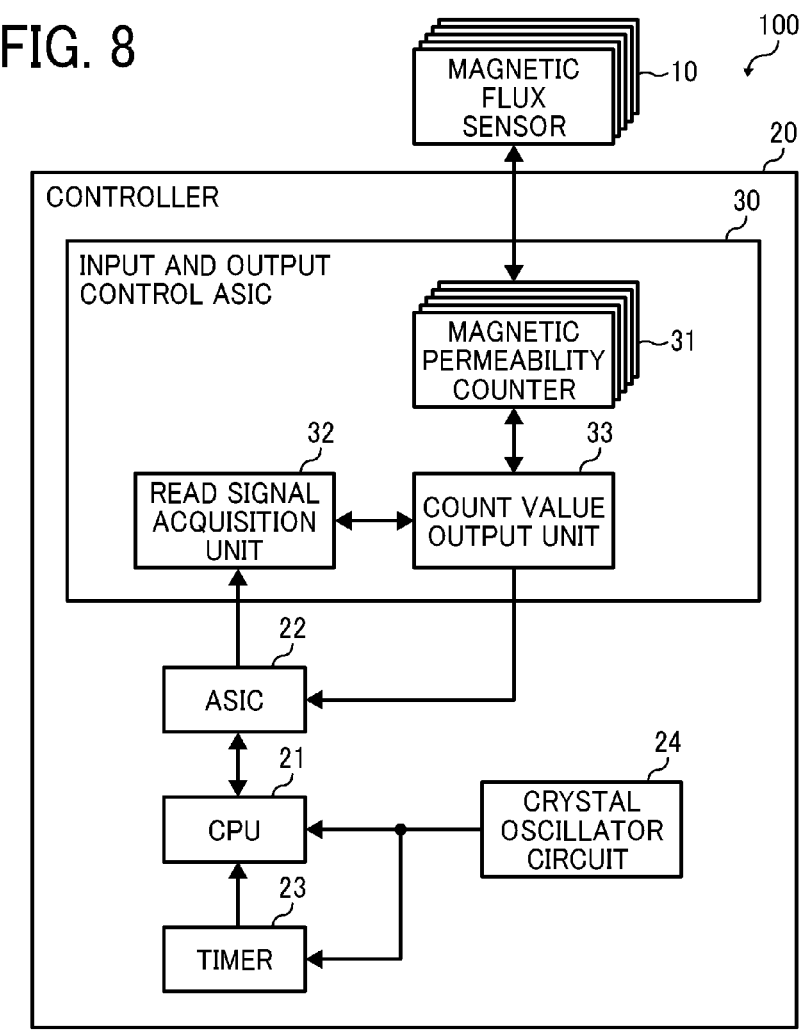
FIG. 8 is a block diagram illustrating a configuration of a controller that acquires the oscillation signal from the magnetic flux sensor according to the embodiment.

Accordingly, a later-described controller 20 illustrated in FIG. 8 is capable of checking the state of the diaphragm 201 disposed facing the planar pattern coil 11 by acquiring the oscillation signal. According to the embodiment, the state of the developer in the sub-hopper 200 is determined based on the thus-checked state of the diaphragm 201.

The oscillation frequency f is obtained by dividing the count value of the oscillation signal by the period for acquiring the count value, as described above. If the period for acquiring the count value is fixed, the acquired count value may be directly used as a parameter representing the oscillation frequency f.

Figure 7:
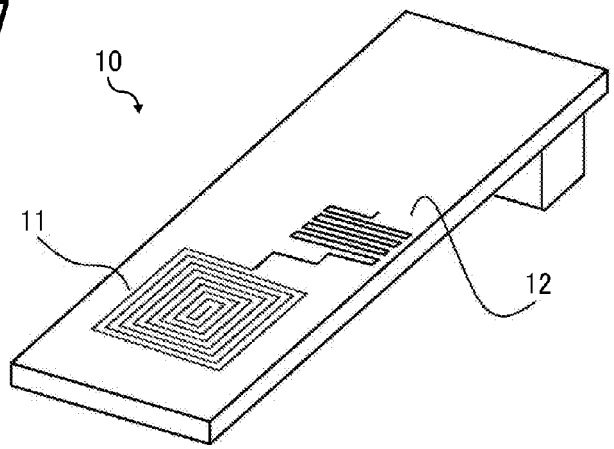
FIG. 7 is a perspective view illustrating an overview of the magnetic flux sensor according to the embodiment.

FIG. 7 is a perspective view illustrating an overview of the magnetic flux sensor 10 according to the embodiment. In FIG. 7, the upper surface of the magnetic flux sensor 10 formed with the planar pattern coil 11 and the pattern resistor 12 described above with FIG. 5 is a detection surface disposed to face the space in which the magnetic permeability is detected.

On the detection surface formed with the planar pattern coil 11, the pattern resistor 12 connected in series to the planar pattern coil 11 is patterned, as illustrated in FIG. 7. As described above with FIG. 5, the planar pattern coil 11 is a pattern of a signal line formed into a spiral shape on a flat surface. Further, the pattern resistor 12 is a pattern of a signal line formed into a zigzag shape on a flat surface. With these patterns, the above-described functions of the magnetic flux sensor 10 are provided.

The planar pattern coil 11 and the pattern resistor 12 cooperate as a magnetic permeability detecting unit of the magnetic flux sensor 10 according to the embodiment. The magnetic flux sensor 10 is attached to the sub-hopper 200 such that the planar pattern coil 11 and the pattern resistor 12 serving as the magnetic permeability detecting unit face the diaphragm 201.

A configuration for acquiring the output value of the magnetic flux sensor 10 in the image forming apparatus 100 according to the embodiment will now be described with reference to FIG. 8.

FIG. 8 is a diagram illustrating a configuration of the magnetic flux sensor 10 and the controller 20 that acquires the output value of the magnetic flux sensor 10. As illustrated in FIG. 8, the controller 20 according to the embodiment includes a central processing unit (CPU) 21, an application specific integrated circuit (ASIC) 22, a timer 23, a crystal oscillator circuit 24, and an input and output control ASIC 30. The configuration in FIG. 8 including the controller 20 serves as a powder detection device and a developer remaining amount detection device.

The CPU 21 is an arithmetic device that controls the operation of the entire controller 20 by performing arithmetic operations in accordance with a program stored in a storage medium such as a read-only memory (ROM). The ASIC 22 functions as a connection interface between a system bus, which is connected to the CPU 21, a random access memory (RAM), and so forth, and another device.

The timer 23 generates and outputs the interrupt signal to the CPU 21 each time the count value of the reference clock input from the crystal oscillator circuit 24 reaches a predetermined value. The CPU 21 outputs a read signal for acquiring the output value of the magnetic flux sensor 10 in accordance with the interrupt signal input from the timer 23. The crystal oscillator circuit 24 generates the reference clock for operating devices included in the controller 20.

The input and output control ASIC 30 acquires the oscillation signal (i.e., detection signal) output from the magnetic flux sensor 10, and converts the oscillation signal into information processable in the controller 20. As illustrated in FIG. 8, the input and output control ASIC 30 includes a magnetic permeability counter 31, a read signal acquisition unit 32, and a count value output unit 33. As described above, the magnetic flux sensor 10 according to the embodiment is an oscillator circuit that outputs the rectangular wave of the frequency according to the magnetic permeability in the detected space.

The magnetic permeability counter 31 increments the count value in accordance with the above-described rectangular wave output from the magnetic flux sensor 10. That is, the magnetic permeability counter 31 functions as a signal counter that counts the occurrences of the signal, the frequency of which is to be calculated. The magnetic flux sensor 10 according to the embodiment is provided to each of the sub-hoppers 200 connected to the developing devices 112Y, 112M, 112C, and 112K for the yellow, magenta, cyan, and black colors, respectively. Accordingly, a plurality of magnetic permeability counters 31 are provided for the yellow, magenta, cyan, and black colors, respectively.

The read signal acquisition unit 32 acquires, via the ASIC 22, the read signal from the CPU 21 indicating a command to acquire the count value of the magnetic permeability counter 31. Having acquired the read signal from the CPU 21, the read signal acquisition unit 32 inputs a signal to the count value output unit 33 to cause the count value output unit 33 to output the count value. The count value output unit 33 then outputs the count value of the magnetic permeability counter 31 in accordance with the signal from the read signal acquisition unit 32.

The access of the CPU 21 to the input and output control ASIC 30 takes place via a register, for example. The above-described acquisition of the read signal therefore takes place when the CPU 21 writes the corresponding value in a predetermined register in the input and output control ASIC 30. Further, the output of the count value by the count value output unit 33 takes place when the count value is stored in a predetermined register in the input and output control ASIC 30 and then acquired by the CPU 21. The controller 20 illustrated in FIG. 8 may be provided separately from the magnetic flux sensor 10, or may be mounted on the substrate of the magnetic flux sensor 10 as a circuit including the CPU 21.

The input and output control ASIC 30 receives the oscillation signal from the magnetic flux sensor 10, and supplies power for operating the magnetic flux sensor 10, which is 3.3 volts in the embodiment. The magnetic flux sensor 10 is connected to a system ground of the input and output control ASIC 30 via a connection line of a system ground of the magnetic flux sensor 10.

In the above-described configuration, the CPU 21 detects the vibration of the diaphragm 201 based on the count value acquired from the count value output unit 33, and detects the toner remaining amount in the sub-hopper 200 based on the detection result. That is, the CPU 21 performs arithmetic operations in accordance with a predetermined program to configure a detection unit. Further, the count value acquired from the count value output unit 33 is used as signal frequency-related information representing the oscillation frequency f of the magnetic flux sensor 10, which changes with the vibration of the diaphragm 201.

A description will now be given of the influence of the diaphragm 201 on the oscillation frequency f of the magnetic flux sensor 10 according to the embodiment.

Figure 9:
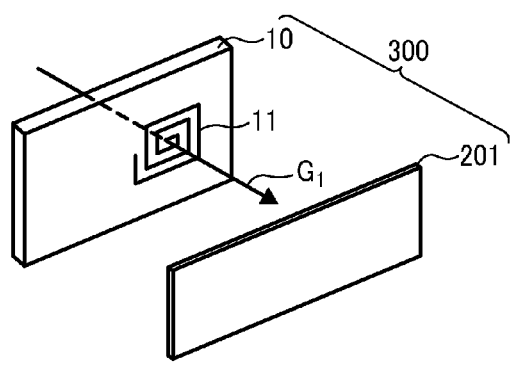
FIG. 9 is a diagram illustrating relative positions of the magnetic flux sensor and a diaphragm according to the embodiment.

As illustrated in FIG. 9, the diaphragm 201 and the surface of the magnetic flux sensor 10 formed with the planar pattern coil 11 are disposed facing each other via the housing 200a of the sub-hopper 200 illustrated in FIGS. 3 and 4, and a magnetic flux $G_1$ centering on the center of the planar pattern coil 11 is generated and passes through the diaphragm 201. Herein, the diaphragm 201 and the magnetic flux sensor 10 form a detection mechanism 300 for detecting the toner remaining amount in the sub-hopper 200.

Figure 10:
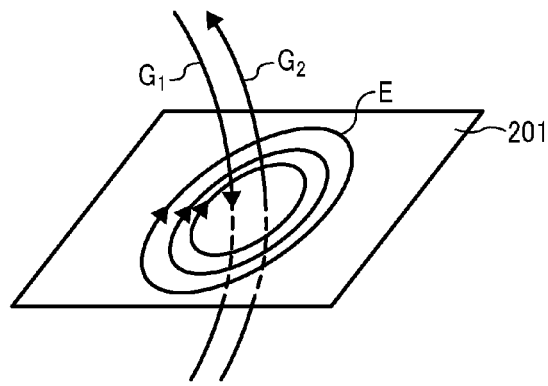
FIG. 10 is a diagram illustrating passage of a magnetic flux through the diaphragm according to the embodiment.

The diaphragm 201 is formed of a steel use stainless (SUS) plate, for example. As illustrated in FIG. 10, the magnetic flux $G_1$ passes through the diaphragm 201, thereby generating an eddy current E in the diaphragm 201. The eddy current E generates a magnetic flux $G_2$ that cancels the magnetic flux $G_1$ generated by the planar pattern coil 11. With the magnetic flux $G_1$ thus cancelled, the inductance L is reduced in the magnetic flux sensor 10. As illustrated in the foregoing equation (1), the reduction in the inductance L increases the oscillation frequency f.

Figure 11:
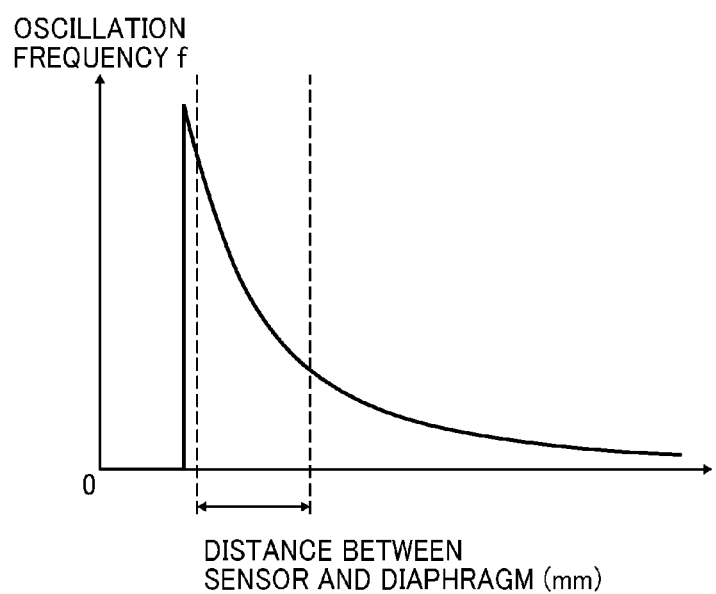
FIG. 11 is a graph illustrating an oscillation frequency of the magnetic flux sensor according to the distance between the diaphragm and the magnetic flux sensor according to the embodiment.

The intensity of the eddy current E generated in the diaphragm 201 by the magnetic flux $G_1$ of the planar pattern coil 11 changes depending on the intensity of the magnetic flux $G_1$ and the distance between the planar pattern coil 11 and the diaphragm 201. FIG. 11 is a graph illustrating the oscillation frequency f of the magnetic flux sensor 10 according to the distance between the planar pattern coil 11 and the diaphragm 201.

The intensity of the eddy current E generated in the diaphragm 201 is in inverse proportion to the distance between the planar pattern coil 11 and the diaphragm 201. As illustrated in FIG. 11, therefore, the oscillation frequency f of the magnetic flux sensor 10 is increased with a reduction in the distance between the planar pattern coil 11 and the diaphragm 201. If the distance between the planar pattern coil 11 and the diaphragm 201 is less than a predetermined value, however, the inductance L is too low to cause oscillation.

With the characteristic illustrated in FIG. 11, the vibration of the diaphragm 201 is detected in the sub-hopper 200 according to the embodiment based on the oscillation frequency f of the magnetic flux sensor 10. According to the embodiment, the toner remaining amount in the sub-hopper 200 is detected based on the thus-detected vibration of the diaphragm 201. That is, the diaphragm 201 and the magnetic flux sensor 10 in FIG. 9 forming the detection mechanism 300 and the configuration in FIG. 8 including the controller 20 to process the oscillation signal output from the magnetic flux sensor 10 form the powder detection device according to the embodiment.

The vibration of the diaphragm 201 flipped by the stirring member 205 is expressed by the natural vibration frequency determined by the rigidity of the diaphragm 201 and the weight of the weight 202 and the attenuation rate determined by external factors absorbing the vibrational energy of the diaphragm 201. The external factors absorbing the vibrational energy include fixed factors, such as the air resistance and the fixing strength of a fixing member 201a in FIG. 12 for fixing the diaphragm 201 in a cantilever manner, and the toner in contact with the diaphragm 201 in the sub-hopper 200.

The vibration of the diaphragm 201 changes depending on the toner remaining amount in the sub-hopper 200. The toner remaining amount in the sub-hopper 200 is therefore detectable based on the detection of the vibration of the diaphragm 201. In the sub-hopper 200 according to the embodiment, therefore, the stirring member 205 for stirring the toner in the sub-hopper 200 flips the diaphragm 201 to periodically vibrate the diaphragm 201 with the rotation thereof.

A description will now be given of the arrangement of components around the diaphragm 201 in the sub-hopper 200 and a configuration for causing the stirring member 205 to flip the diaphragm 201.

Figure 12:
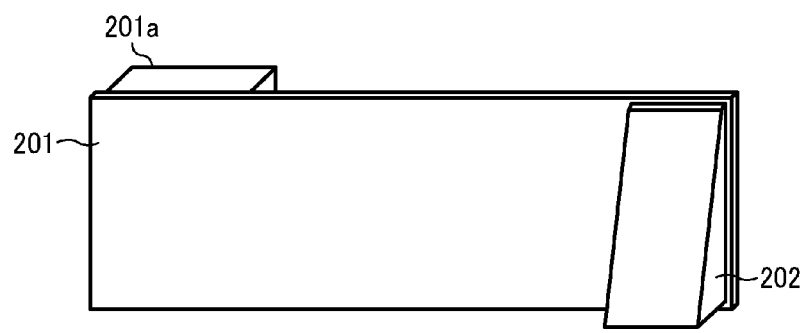
FIG. 12 is a perspective view illustrating relative positions of components around the diaphragm according to the embodiment.
Figure 15:
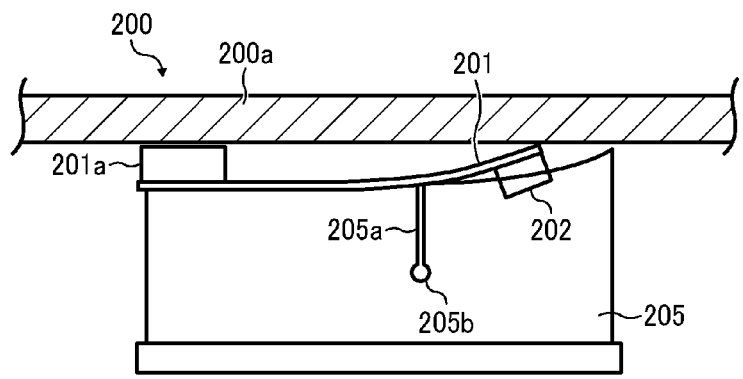
FIG. 15 is a top view illustrating the relative positions of the diaphragm and the stirring member according to the embodiment in FIG. 14.

FIG. 12 is a perspective view illustrating relative positions of components around the diaphragm 201. As illustrated in FIGS. 12 and 15, the diaphragm 201 is fixed to the housing 200a of the sub-hopper 200 via the fixing member 201a.

Figure 13:
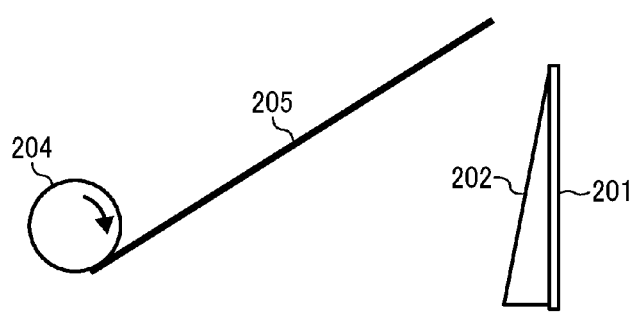
FIG. 13 is a side view illustrating relative positions of the diaphragm and a stirring member according to the embodiment.

FIG. 13 is a side view illustrating a state before the stirring member 205 comes into contact with the weight 202 attached to the diaphragm 201 with the rotation of the rotary shaft 204. In FIG. 13, the rotary shaft 204 rotates to rotate the stirring member 205 clockwise. As illustrated in FIG. 13, the weight 202 is inclined relative to a surface of the diaphragm 201, as viewed from a side. The stirring member 205 pushes an inclined surface of the weight 202 to flip and vibrate the diaphragm 201.

Figure 14:
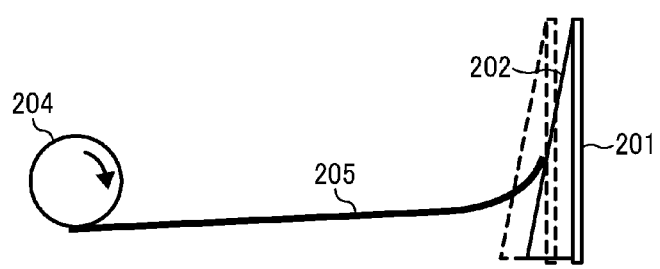
FIG. 14 is a side view illustrating relative positions of the diaphragm and the stirring member according to the embodiment.

FIG. 14 is a side view illustrating the stirring member 205 further rotated from the state illustrated in FIG. 13. With the stirring member 205 further rotated while in contact with the weight 202, the diaphragm 201 is pushed in accordance with the inclination of the weight 202. In FIG. 14, the positions of the diaphragm 201 and the weight 202 in a stationary state not applied with external force are indicated by broken lines. The diaphragm 201 and the weight 202 are pushed by the stirring member 205, as indicated by solid lines in FIG. 14.

FIG. 15 is a top view illustrating the state in FIG. 14. Since the diaphragm 201 is fixed to the inner wall of the housing 200a of the sub-hopper 200 via the fixing member 201a, an end portion of the diaphragm 201 on the side of the fixing member 201a is unchanged in position. Contrastively, the other end portion of the diaphragm 201 provided with the weight 202 and acting as a free end is pushed by the stirring member 205, thereby moving away from the side of the rotary shaft 204 (i.e., the lower side in FIG. 15). Consequently, the diaphragm 201 is bent, as illustrated in FIG. 15, with the fixing member 201a serving as a base point. With the diaphragm 201 thus bent, the energy for vibrating the diaphragm 201 is built up.

As illustrated in FIG. 15, the stirring member 205 according to the embodiment is provided with an incision 205a between a portion of the stirring member 205 that comes into contact with the weight 202 and the remaining portion of the stirring member 205. With this configuration, the stirring member 205 pushing the weight 202 is prevented from being damaged by excessive force applied thereto.

Further, a circular portion 205b is provided at the start point of the incision 205a. This configuration disperses stress applied to the start point of the incision 205a when the amount of bending of the stirring member 205 is different between the two portions of the stirring member 205 across the incision 205a, thereby preventing the damage of the stirring member 205.

Figure 16:
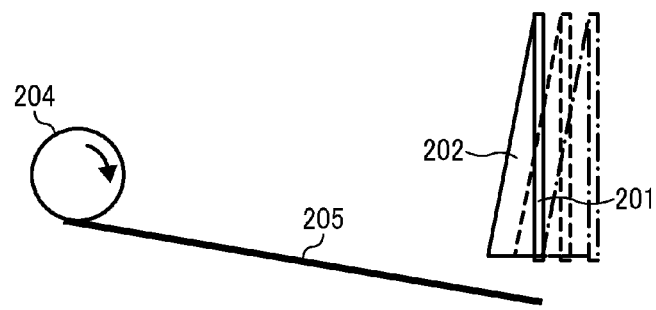
FIG. 16 is a side view illustrating relative positions of the diaphragm and the stirring member according to the embodiment.

FIG. 16 is a side view illustrating the stirring member 250 further rotated from the state illustrated in FIG. 14. In FIG. 16, the positions of the diaphragm 201 and the weight 202 in the stationary state are indicated by dashed lines, and the positions of the diaphragm 201 and the weight 202 indicated by solid lines in FIG. 14 are indicated by dashed and dotted lines. Further, the positions of the diaphragm 201 and the weight 202 bent toward the opposite side (i.e., toward the rotary shaft 204) by the release of the vibrational energy built up in the diaphragm 201 while being pushed by the stirring member 205 are indicated by solid lines.

Figure 17:
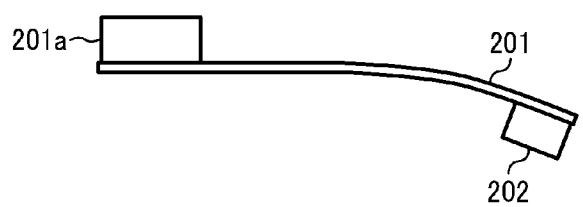
FIG. 17 is a top view illustrating vibration of the diaphragm according to the embodiment.

FIG. 17 is a top view illustrating the state in FIG. 16. As illustrated in FIG. 16, when the push on the weight 202 by the stirring member 205 is released, the free end portion of the diaphragm 201 provided with the weight 202 is bent to move toward the opposite side (i.e., toward the rotary shaft 204) owing to the bending energy built up in the diaphragm 201.

In the state illustrated in FIGS. 16 and 17, the diaphragm 201 is away from the magnetic flux sensor 10 facing the diaphragm 201 via the housing 200a of the sub-hopper 200. The diaphragm 201 thereafter continues to vibrate back and forth between the position closer to the magnetic flux sensor 10 than the position in the stationary state and the position farther from the magnetic flux sensor 10 than the position in the stationary state, and eventually returns to the position in the stationary state with the attenuation of the vibration.

Figure 18:
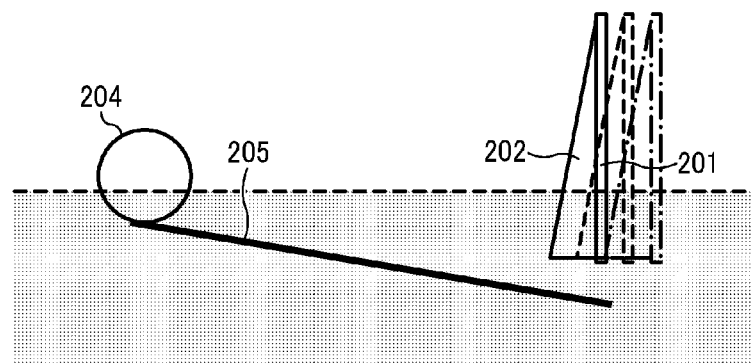
FIG. 18 is a side view illustrating the relationship between the vibration of the diaphragm and a developer according to the embodiment.

FIG. 18 is a schematic diagram illustrating the state of the toner stored in the sub-hopper 200. In FIG. 18, the toner is indicated by hatching. If the toner is present in the sub-hopper 200, as illustrated in FIG. 18, the diaphragm 201 and the weight 202 are in contact with the toner while vibrating. In this case, therefore, the vibration of the diaphragm 201 attenuates faster than in a case in which the toner is absent in the sub-hopper 200. Thus, the toner remaining amount in the sub-hopper 200 is detectable based on a change in the attenuation of the vibration.

Figure 19:
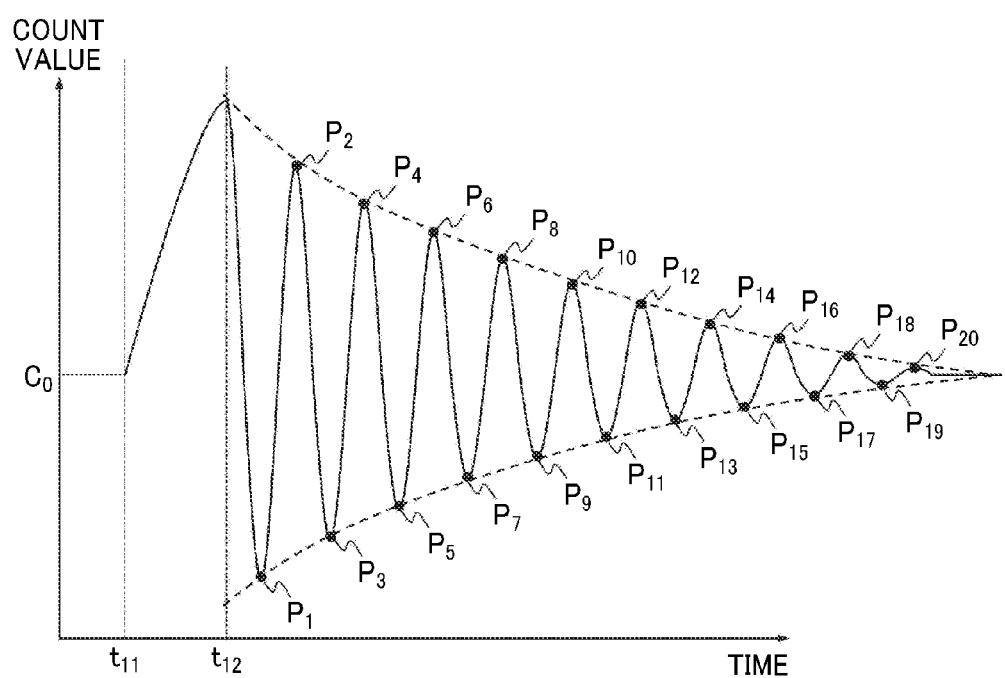
FIG. 19 is a graph illustrating a change over time of a count value according to the oscillation frequency of the magnetic flux sensor, which occurs in accordance with attenuation of the vibration of the diaphragm according to the embodiment.

FIG. 19 is a graph illustrating a change in the count value of the oscillation signal of the magnetic flux sensor 10 at predetermined periods after the stirring member 205 flips the weight 202 until the vibration of the diaphragm 201 attenuates and stops. The count value of the oscillation signal of the magnetic flux sensor 10 increases with the increase in the oscillation frequency f. Therefore, the count value represented by the vertical axis of FIG. 19 may be replaced by the oscillation frequency f.

As illustrated in FIG. 19, the stirring member 205 comes into contact with and starts pushing the weight 202 at a time $t_{11}$, thereby moving the diaphragm 201 toward the magnetic flux sensor 10. Accordingly, the oscillation frequency f of the magnetic flux sensor 10 rises, increasing the count value at predetermined periods.

Then, the push on the weight 202 by the stirring member 205 is released at a time $t_{12}$, and the diaphragm 201 thereafter vibrates with the built-up vibrational energy. With the vibration of the diaphragm 201, the distance between the diaphragm 201 and the magnetic flux sensor 10 is alternately increased and reduced relative to the distance between the magnetic flux sensor 10 and the diaphragm 201 in the stationary state. Consequently, the oscillation frequency f of the oscillation signal of the magnetic flux sensor 10 fluctuates with the vibration of the diaphragm 201, and the count value similarly fluctuates at the predetermined periods.

The amplitude of the vibration of the diaphragm 201 is reduced with the consumption of the vibrational energy. That is, the vibration of the diaphragm 201 attenuates with time. Therefore, the change in the distance between the diaphragm 201 and the magnetic flux sensor 10 is also reduced with time, and so is the change in the count value, as illustrated in FIG. 19.

As described above, the greater the toner remaining amount in the sub-hopper 200 is, the faster the vibration of the diaphragm 201 attenuates. Through the analysis of the attenuation of the fluctuations in the oscillation signal of the magnetic flux sensor 10, such as the attenuation illustrated in FIG. 19, therefore, it is possible to know how the vibration of the diaphragm 201 attenuates and thereby to detect the toner remaining amount in the sub-hopper 200.

When peak values of the fluctuations of the count value are represented as $P_1$, $P_2$, $P_3$, $P_4$, $P_5$, and so forth, as illustrated in FIG. 19, therefore, an attenuation rate $\zeta$ of the vibration of the diaphragm 201 is obtainable from the following equation (2):

$$\zeta = \frac{P_6 - P_5}{P_2 - P_1} \qquad (2)$$

With reference to the ratio of peak values at different times, such as the ratio illustrated in the equation (2), errors due to environmental fluctuations are cancelled, allowing the attenuation rate $\zeta$ to be accurately calculated. That is, the CPU 21 according to the embodiment calculates the attenuation rate $\zeta$ based on the ratio of count values acquired at different times.

In the peak values illustrated in FIG. 19, the peak values $P_1$, $P_2$, $P_5$, and $P_6$ are used in the equation (2) given above. However, the peak values $P_1$, $P_2$, $P_5$, and $P_6$ are illustrative, and may be replaced by other peak values. At the time $t_{12}$, at which the diaphragm 201 is pushed by the stirring member 205 to the position closest to the magnetic flux sensor 10, the peak value contains an error due to superimposition of sliding noise caused by friction between the stirring member 205 and the weight 202. It is therefore preferable to exclude the peak value at the time $t_{12}$ from the calculation.

Even if the attenuation of the vibration is advanced by the toner present in the sub-hopper 200, as illustrated in FIG. 18, the vibration frequency of the diaphragm 201 does not significantly change. It is therefore possible to calculate the attenuation of the amplitude in a predetermined period by calculating the ratio of the amplitudes of specific peak values, as described in the above equation (2).

An operation of detecting the toner remaining amount in the sub-hopper 200 according to the embodiment will now be described with reference to the flowchart in FIG. 20.

Figures 20, 21:
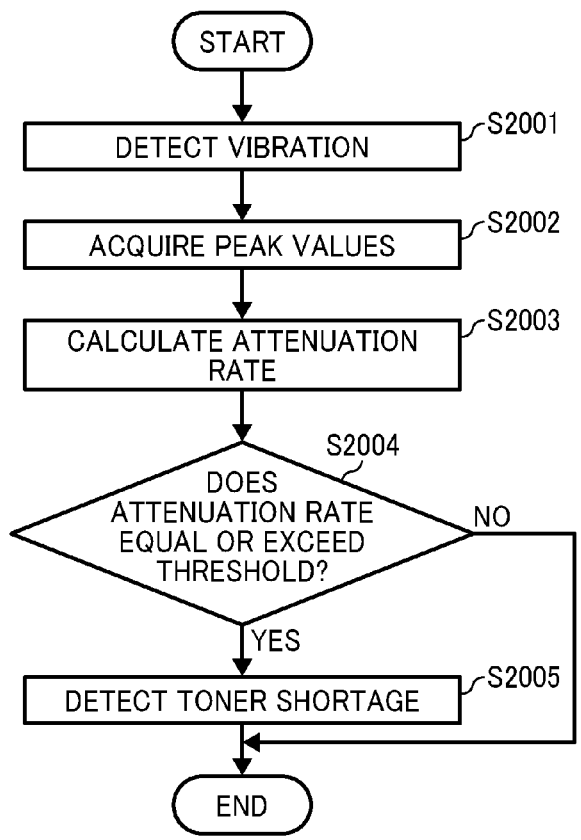
FIG. 20 is a flowchart illustrating an operation of detecting a toner remaining amount according to the embodiment.
FIG. 21 is a table illustrating an embodiment of analyzing the count value according to the embodiment.

The flowchart in FIG. 20 illustrates an operation of the CPU 21 illustrated in FIG. 8. As illustrated in FIG. 20, the CPU 21 first detects the occurrence of vibration caused by the stirring member 205 pushing the weight 202, as illustrated in FIG. 14 (step S2001).

As described above, the CPU 21 acquires the count value of the output oscillation signal of the magnetic flux sensor 10 from the count value output unit 33 at predetermined periods. In the stationary state, a count value $C_0$ is obtained, as illustrated in FIG. 19. If the weight 202 is pushed, as illustrated in FIG. 14, the count value increases with the approach of the diaphragm 201 toward the magnetic flux sensor 10. The CPU 21 then detects the occurrence of vibration at step S2001 when the count value acquired from the count value output unit 33 exceeds a predetermined threshold.

The CPU 21 continuously performs the process of acquiring the count value at the predetermined periods as a regular process, regardless of before or after step S2001. After step S2001, the CPU 21 acquires the peak values of the fluctuations in the count value according to the vibration of the diaphragm 201 as illustrated in FIG. 19 (step S2002). At step S2002, the CPU 21 identifies the peak values by analyzing the count value continuously acquired at the predetermined periods.

FIG. 21 is a table illustrating an embodiment of analyzing the count value. FIG. 21 illustrates, in the order of acquisition, count values $S_n$ acquired at the predetermined periods, the number n assigned to each of the count values $S_n$, and the plus or minus sign before a difference $S_{n-1}-S_n$ of the count value $S_n$ from an immediately preceding count value $S_{n-1}$. In the results as illustrated in FIG. 21, a count value immediately preceding a count value at which the plus or minus sign of the difference $S_{n-1}-S_n$ changes is a peak value. In the example of FIG. 21, the fifth and tenth count values are adopted as peak values.

That is, the CPU 21 calculates the difference $S_{n-1}-S_n$ illustrated in FIG. 21 for each of the count values $S_n$ sequentially acquired after step S2001, and adopts, as the peak values such as $P_1$, $P_2$, $P_3$ and so forth illustrated in FIG. 19, the count values $S_n$ immediately preceding the times at which the plus or minus sign obtained from the calculation changes.

The value at the time $t_{12}$, which corresponds to the first peak after step S2001, is preferably excluded from the calculation, as described above. The CPU 21 therefore discards the first one of the peak values extracted through the analysis as illustrated in FIG. 21.

Further, an actually obtained count value may contain high-frequency component noise, and thus the plus or minus sign of the difference "$S_{n-1}-S_n$" may change at a time not corresponding to a peak according to the vibration of the diaphragm 201. To prevent a detection error in such a case, the CPU 21 preferably performs a process of smoothing the values acquired from the count value output unit 33 and then performs the analysis illustrated in FIG. 21. A common process using the moving average method, for example, may be employed in the smoothing process.

After having thus acquired the peak values, the CPU 21 calculates the attenuation rate $\zeta$ through the calculation of the equation (2) (step S2003). At step S2002, therefore, the CPU 21 continues to analyze the count values in accordance with the embodiment illustrated in FIG. 21 until the peak values to be used in the calculation of the attenuation rate $\zeta$ are obtained. When using the equation (2), the CPU 21 continues to analyze the count values until the peak value $P_6$ is obtained.

After having thus calculated the attenuation rate $\zeta$, the CPU 21 determines whether or not the calculated attenuation rate $\zeta$ equals or exceeds a predetermined threshold (step S2004). That is, based on comparison between the ratio of the count values acquired at different times and the predetermined threshold, the CPU 21 determines whether or not the toner in the sub-hopper 200 has fallen below a predetermined amount. As described above with FIG. 18, if a sufficient amount of toner is left in the sub-hopper 200, the vibration of the diaphragm 201 attenuates fast, consequently reducing the attenuation rate $\zeta$.

Conversely, if the toner in the sub-hopper 200 is reduced, the attenuation of the vibration of the diaphragm 201 slows down accordingly, increasing the attenuation rate $\zeta$. With the threshold set to an attenuation rate $\zeta_s$ according to a specified amount of remaining toner to be detected, therefore, it is possible to determine whether or not the toner remaining amount in the sub-hopper 200 has been reduced to the specified amount based on the calculated attenuation rate $\zeta_s$.

If it is determined at step S2004 that the calculated attenuation rate $\zeta$ is less than the threshold attenuation rate $\zeta_s$ (NO at step S2004), the CPU 21 determines that a sufficient amount of toner is stored in the sub-hopper 200, and completes the operation. If the calculated attenuation rate $\zeta$ equals or exceeds the threshold attenuation rate $\zeta_s$ (YES at step S2004), the CPU 21 determines that the toner amount in the sub-hopper 200 has fallen below the specified amount, and performs a toner shortage detection process (step S2005) before completing the operation.

In the toner shortage detection process at step S2005, the CPU 21 outputs a signal indicating that the toner remaining amount has fallen below the specified amount to a higher controller that controls the image forming apparatus 100. This process allows the higher controller of the image forming apparatus 100 to recognize the shortage of the toner for a specific color and supply the toner from the corresponding toner bottle 117.

A description will now be given of the relationship between the oscillation frequency f of the oscillation signal of the magnetic flux sensor 10, a sampling period for the CPU 21 to acquire the count values, and the natural vibration frequency of the diaphragm 201 according to the embodiment.

Figure 22:
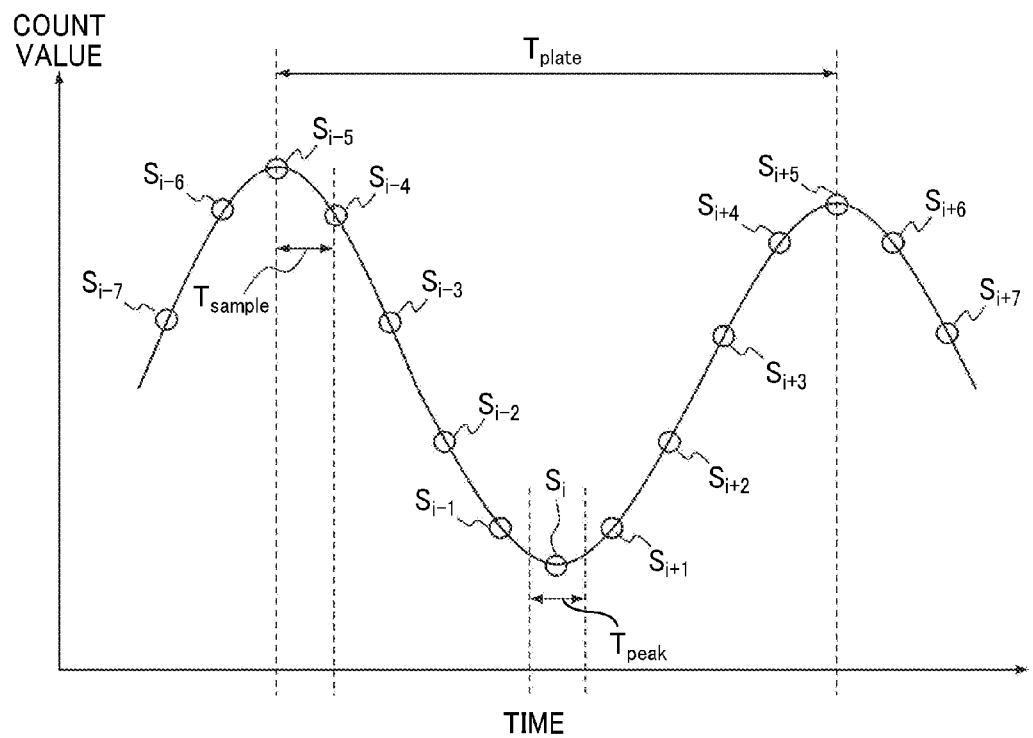
FIG. 22 is a graph illustrating the relationship between a sampling period of the count value and a vibration period of the diaphragm according to the embodiment.

FIG. 22 is a graph illustrating count values sampled for one period of vibration of the diaphragm 201. In FIG. 22, the vibration period of the diaphragm 201 is represented as $T_{plate}$, and the sampling period is represented as $T_{sample}$.

To accurately calculate the attenuation rate $\zeta$ of the vibration of the diaphragm 201 with the embodiment described above with reference to FIGS. 19 to 21, it is necessary to accurately acquire the peak values of the vibration of the diaphragm 201. It is therefore necessary that a sufficient number of count values are sampled for the vibration period $T_{plate}$, and thus that the sampling period $T_{sample}$ is sufficiently short relative to the vibration period $T_{plate}$.

In the example of FIG. 22, ten count values are sampled for one vibration period $T_{plate}$. That is, the sampling period $T_{sample}$ is one tenth of the vibration period $T_{plate}$. According to the embodiment in FIG. 22, the sampling reliably takes place during a period $T_{peak}$ in the drawing, as illustrated by a count value $S_i$, and thus the peak values are accurately acquired.

If the sampling period $T_{sample}$ of the CPU 21 is 1 millisecond, therefore, the vibration period $T_{plate}$ of the diaphragm 201 is preferably 10 milliseconds or longer. In other words, when the CPU 21 has a sampling frequency of 1000 Hz, the natural vibration frequency of the diaphragm 201 is preferably approximately 100 Hz, and more preferably lower than approximately 100 Hz. Such a natural vibration frequency of the diaphragm 201 is obtained by adjusting the material of the diaphragm 201, dimensions of the diaphragm 201 such as the thickness thereof, and the weight of the weight 202.

If the count values sampled at the sampling periods $T_{sample}$ are too small, changes in the sampled count values according to the vibration of the diaphragm 201 are too small to accurately calculate the attenuation rate $\zeta$. Herein, the sampled count values are based on the oscillation frequency f of the magnetic flux sensor 10.

The oscillation frequency f of the magnetic flux sensor 10 is normally on the order of a few MHz. If the sampling is performed at a sampling frequency of 1000 Hz, 1000 or more count values are obtained at each time of sampling. Accordingly, the attenuation rate $\zeta$ is accurately calculated on the order of the vibration period $T_{plate}$ and the sampling period $T_{sample}$ as described above.

If the change in the oscillation frequency f of the magnetic flux sensor 10 is insufficient relative to the change in the distance between the magnetic flux sensor 10 and the diaphragm 201 due to the vibration of the diaphragm 201, the amplitude of fluctuations over time in the count value, such as that illustrated in FIG. 19, is reduced. Consequently, the change in the attenuation rate ζ is also reduced, thereby degrading the accuracy in detecting the toner remaining amount based on the vibration of the diaphragm 201.

To increase the amount of change in the oscillation frequency f of the magnetic flux sensor 10 relative to the change in the distance between the magnetic flux sensor 10 and the diaphragm 201, it is necessary to determine the distance between the magnetic flux sensor 10 and the diaphragm 201 based on the characteristic as illustrated in FIG. 11. For example, it is preferable to set the distance between the magnetic flux sensor 10 and the diaphragm 201 within a range indicated by an arrow in FIG. 11, in which the oscillation frequency f sharply changes relative to the change in the distance between the magnetic flux sensor 10 and the diaphragm 201.

Figure 23:
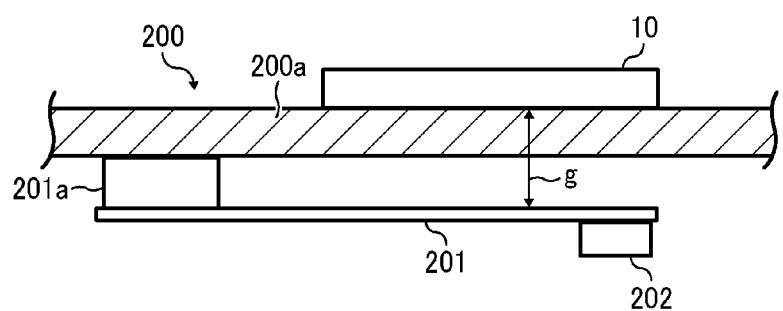
FIG. 23 is a diagram illustrating the distance between the magnetic flux sensor and the diaphragm according to the embodiment.

FIG. 23 is a diagram illustrating an embodiment of adjusting the distance between the magnetic flux sensor 10 and the diaphragm 201. As illustrated in FIG. 23, a distance g between the magnetic flux sensor 10 and the diaphragm 201 may be adjusted by adjusting the thickness of the housing 200a of the sub-hopper 200 attached with the magnetic flux sensor 10 and the diaphragm 201 or the thickness of the fixing member 201a fixed to the diaphragm 201.

Figure 24:
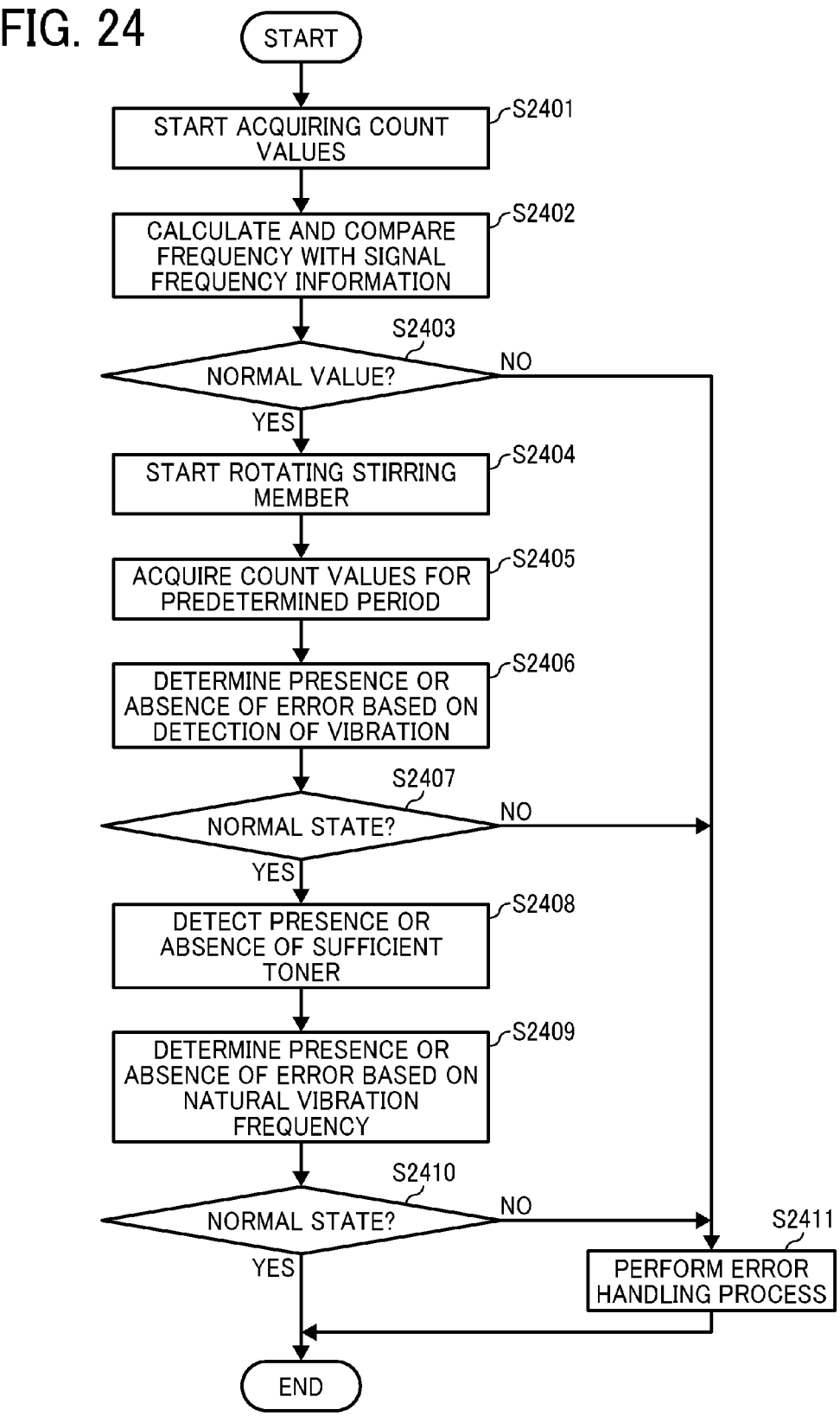
FIG. 24 is a flowchart illustrating an error determination operation according to the embodiment.

With reference to FIG. 24, a description will now be given of an operation of determining the presence or absence of an error in related units based on the oscillation signal of the magnetic flux sensor 10 according to the embodiment.

The operation illustrated in FIG. 24 is performed when the controller 20 supplies power to the magnetic flux sensor 10 to start the oscillation of the magnetic flux sensor 10. At this stage, the stirring member 205 is stopped with the rotary shaft 204 not driven to rotate in the sub-hopper 200.

If the magnetic flux sensor 10 is supplied with power and starts to oscillate in such a state, the CPU 21 starts acquiring count values at the predetermined periods (step S2401), as described above. Having acquired the count values from the input and output control ASIC 30, the CPU 21 calculates the oscillation frequency f of the oscillation signal of the magnetic flux sensor 10 based on the count values, and compares the calculated oscillation frequency f with signal frequency information as a reference for comparison (step S2402).

FIG. 25 is a table illustrating an example of the signal frequency information referred to at step S2402. As illustrated in FIG. 25, in the signal frequency information according to the embodiment, predetermined frequency ranges for determining an error in the detection mechanism 300 including the magnetic flux sensor 10 and the diaphragm 201 are associated with types of expected errors. The signal frequency information illustrated in FIG. 25 is stored in a storage medium included in the controller 20, such as a memory provided in the ASIC 22.

For example, the magnetic flux sensor 10 may fail to transmit the oscillation signal, resulting in zero as the calculated oscillation frequency f, even if the magnetic flux sensor 10 is supplied with power. In such a case, the type of error varies depending on whether the oscillation signal output by the magnetic flux sensor 10 is fixed to HIGH level or LOW level. If the oscillation signal is fixed to HIGH level, disconnection of a connector of the magnetic flux sensor 10 or a failure of the oscillator circuit of the magnetic flux sensor 10 is expected.

If the oscillation signal is fixed to LOW level, a harness ground fault or a failure of the oscillator circuit is expected. These determination results are obtained in a case in which the magnetic flux sensor 10 has an open drain output and the input and output control ASIC 30 performs pull-up. The determination results may be reversed depending on how the magnetic flux sensor 10 is driven.

As described above with FIG. 19, when the diaphragm 201 is not vibrating, the count value of the oscillation signal from the magnetic flux sensor 10 is $C_0$, and the oscillation frequency f of the oscillation signal has the value according to the count value $C_0$. The detection mechanism 300 is therefore considered to be in a normal state if the oscillation frequency f calculated at step S2402 is within a predetermined range centering on a frequency value corresponding to the count value $C_0$. In the example of FIG. 25, if the calculated oscillation frequency f is in a range of 3.1 MHz≤f<3.4 MHz, the CPU 21 determines that the detection mechanism 300 is in the normal state.

If the assembly of the magnetic flux sensor 10 and the diaphragm 201 is different from designed assembly, with the distance g described above with FIG. 23 being different from an intended distance, the calculated oscillation frequency f changes in accordance with the difference. In the example of FIG. 25, if the calculated oscillation frequency f is in a range of 2.9 MHz≤f<3.1 MHz or a range of 3.4 MHz≤f<3.6, the CPU 21 determines poor assembly of the detection mechanism 300 as described above.

Further, the magnetic flux sensor 10 may come in various types, and the reference frequency of the magnetic flux sensor 10 may vary depending on the type. The determination with the threshold at step S2004 in FIG. 20 is made with reference to the oscillation signal of a specific type of magnetic flux sensor 10. If a different type of magnetic flux sensor 10 is mounted to the sub-hopper 200, therefore, accurate detection is prevented. In the example in FIG. 25, if the calculated oscillation frequency f is in a range of f<2.9 MHz or a range of 3.6≤f, the CPU 21 determines that a different type of magnetic flux sensor 10 is installed to the sub-hopper 200.

FIG. 25 illustrates an example in which the oscillation frequency f of the oscillation signal of the magnetic flux sensor 10 is associated with the type of error in the detection mechanism 300. However, the example is illustrative, and the oscillation frequency f may be replaced by a value that changes with the oscillation frequency f, such as the count value acquired from the count value output unit 33, for example.

If any error is determined as a result of the process at step S2402 (NO at step S2403), i.e., if the calculated oscillation frequency f is not in the range of 3.1 MHz≤f<3.4 MHz, the CPU 21 performs an error handling process in accordance with the determination result (step S2411), and completes the operation. In the error handling process at step S2411, the CPU 21 displays an error message on a display panel in accordance with the determination result, and stops the operation of the image forming apparatus 100, for example.

If the calculated oscillation frequency f is determined to be normal as a result of the process at step S2402 (YES at step S2403), the CPU 21 drives and rotates the rotary shaft 204 to start rotating the stirring member 205 (step S2404). Thereby, the diaphragm 201 vibrates with the rotation of the stirring member 205, as described above with FIGS. 13, 14, and 16.

Thereafter, the CPU 21 acquires the count values for one rotation of the stirring member 205 (step S2405), and determines the presence or absence of an error based on the detection of the vibration of the diaphragm 201 in accordance with the acquired count values (step S2406). FIG. 26 is a table illustrating an example of vibration information referred to at step S2406. As illustrated in FIG. 26, in the vibration information, the presence or absence of the vibration of the diaphragm 201 is associated with the result of determination on the presence or absence of an error. The vibration information illustrated in FIG. 26 is stored in a storage medium included in the controller 20, such as a memory provided in the ASIC 22.

The rotation of the stirring member 205 has already started at step S2404. With reference to the count values obtained during the one rotation of the stirring member 205, therefore, the fluctuations in the count value according to the vibration of the diaphragm 201 are expected to be extracted, as illustrated in FIG. 19. If the vibration of the diaphragm 201 is not extracted, therefore, damage of the stirring member 205 made of Mylar (trademark), for example, damage of the diaphragm 201, toner clogging occurring around the diaphragm 201, a failure of a motor that drives and rotates the rotary shaft 204, or a torque error in the motor, for example, is expected.

In the detection of the vibration of the diaphragm 201 at step S2406, a process similar to the foregoing process of step S2001 may be performed. Further, the acquisition of peak values and the determination of whether or not a plurality of peak values have been acquired within a predetermined period may be performed, as described above. If the vibration is not detected, i.e., if the normal state is not determined, as a result of the determination at step S2406 (NO at step S2407), the CPU 21 determines the occurrence of the above-described error in the detection mechanism 300, and performs the forgoing error handling process (step S2411). Thereafter, the CPU 21 completes the operation.

If the vibration is detected, i.e., if the normal state is determined, as a result of the determination at step S2406 (YES at step S2407), the CPU 21 performs the operation of detecting the presence or absence of sufficient toner described above with FIG. 20 (step S2408). Having performed the operation of detecting the presence or absence of sufficient toner, the CPU 21 determines the presence or absence of an error based on the result of the detection of the presence or absence of sufficient toner and the natural vibration frequency of the diaphragm 201 acquired as illustrated in FIG. 19 (step S2409).

At step S2409, the CPU 21 calculates the vibration frequency of the diaphragm 201 based on the peak values of the count value acquired as illustrated in FIG. 19. The vibration frequency is calculated based on a result of measurement of the period from the acquisition of the first peak value to the acquisition of the tenth peak value. Based on the calculated vibration frequency and the detection result obtained at step S2408, the CPU 21 then determines the presence or absence of an error with reference to vibration frequency information as illustrated in FIG. 27.

Figures 27, 28:
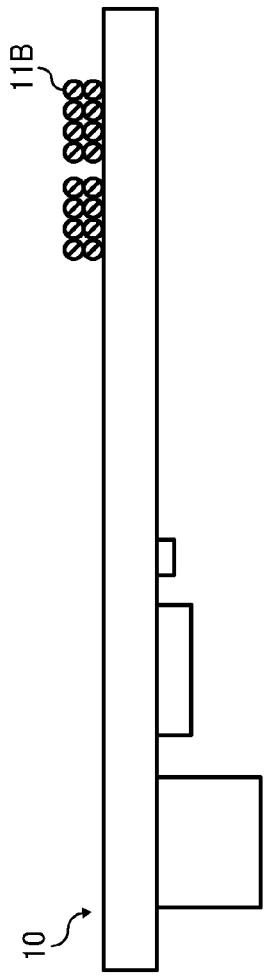
FIG. 27 is a table illustrating vibration frequency information as an example of the error determination information according to the embodiment.
FIG. 28 is a side view illustrating a modified example of a coil of the magnetic flux sensor according to the embodiment.

As illustrated in FIG. 27, the vibration frequency information is a matrix table of the range of a vibration frequency vf of the diaphragm 201 and the presence or absence of sufficient toner. The vibration frequency information illustrated in FIG. 27 is stored in a storage medium included in the controller 20, such as a memory provided in the ASIC 22. The range of the vibration frequency vf of the diaphragm 201 is divided into sub-ranges with a lower threshold $TH_2$ and an upper threshold $TH_1$ for determining the normal state. If the calculated vibration frequency vf is in a range of $TH_2 \leq vf < TH_1$, the CPU 21 determines that the vibration frequency vf of the diaphragm 201 is normal, and thus that the detection mechanism 300 is in the normal state.

If the vibration frequency vf is in a range of $vf < TH_2$ and the presence of sufficient toner is detected at step S2408, the CPU 21 determines a failure of the diaphragm 201, such as toner adherence thereto, or an error of the supplied toner. If the vibration frequency vf is in the range of $vf < TH_2$ and the absence of sufficient toner is detected at step S2408, the CPU 21 determines a failure of the diaphragm 201, such as toner adherence thereto.

If the vibration frequency vf is in a range of $TH_1 \leq vf$ and the presence of sufficient toner is detected at step S2408, the CPU 21 determines the loss of the weight 202 or a part of the diaphragm 201 or an error of the supplied toner. If the vibration frequency vf is in the range of $TH_1 \leq vf$ and the absence of sufficient toner is detected at step S2408, the CPU 21 determines the loss of the weight 202 or a part of the diaphragm 201.

In the above-described example of FIG. 27, the vibration frequency vf of the diaphragm 201 is associated with the combination of the presence or absence of sufficient toner and the information of the type of error. However, this example is illustrative, and the vibration frequency vf of the diaphragm 201 may be replaced by a value that changes with the vibration frequency vf of the diaphragm 201, such as the above-described result of measurement of the period from the acquisition of the first peak value to the acquisition of the tenth peak value, for example.

If the normal state is determined as a result of the determination at step S2409 (YES at step S2410), the CPU 21 confirms that no error has occurred in the detection mechanism 300, and completes the operation. In this case, the CPU 21 may inform a user that no error has been detected in the detection mechanism 300 by displaying a message on the display panel, for example. If any error is determined, i.e., the normal state is not determined, as a result of the determination at step S2409 (NO at step S2410), the CPU 21 performs the error handling process (step S2411), and completes the operation. With the thus-performed processes, the operation of determining the presence or absence of an error in the detection mechanism 300 according to the embodiment is completed.

As described above, the method of detecting the toner remaining amount according to the embodiment detects the influence of the toner on a delicate phenomenon of the vibration of the diaphragm 201. Further, unlike a method of directly detecting the pressure of the toner, for example, the detection method according to the embodiment detects the toner remaining amount based on the vibration of the diaphragm 201. The detection method according to the embodiment is therefore capable of accurately detecting the toner remaining amount in the sub-hopper 200 (i.e., a container) without, for example, a pressure sensor, the accuracy of which is difficult to improve.

As illustrated in FIGS. 25 to 27, the present detection method is further capable of determining the presence or absence of an error in the detection mechanism 300 with the information obtained based on the oscillation signal from the magnetic flux sensor 10. The detection method is therefore capable of accurately detecting the shortage of the toner remaining in the sub-hopper 200 (i.e., the developer remaining in the container) and also determining the presence or absence of an error in the detection mechanism 300. The information illustrated in FIGS. 25 to 27 is used as error determination information in which the state of the oscillation signal of the magnetic flux sensor 10 obtained based on the oscillation frequency f of the magnetic flux sensor 10 is associated with the type of error in the detection mechanism 300.

In the above-described example of the embodiment, the diaphragm 201 subjected to sensing by the magnetic flux sensor 10 is a plate-shaped member made of a metal material. However, this example is illustrative. The diaphragm 201 at least vibrates at the predetermined vibration frequency as described above with FIG. 22, affects the magnetic flux in accordance with the change in the distance from the magnetic flux sensor 10, and affects the oscillation frequency f of the oscillation signal of the magnetic flux sensor 10.

In the above-described embodiment, the diaphragm 201 is made of a metal material that cancels the magnetic flux and reduces the inductance L while approaching the magnetic flux sensor 10. Conversely, the diaphragm 201 may be made of a ferromagnetic material that increases the magnetic flux and the inductance L while approaching the magnetic flux sensor 10.

In the above-described embodiment, the diaphragm 201 subjected to the sensing by the magnetic flux sensor 10 is a plate-shaped member in consideration of the natural vibration frequency of the diaphragm 201 and the influence of the diaphragm 201 on the magnetic flux generated by the planar pattern coil 11 of the magnetic flex sensor 10. However, this example is illustrative. Thus, the diaphragm 201 is not limited to the plate-shaped member, and may be a rod-shaped member, as long as the member vibrates and affects the magnetic flux.

Further, in the above-described example of the embodiment, the detection mechanism 300 for detecting the toner remaining amount in the sub-hopper 200 illustrated in FIG. 2 has a configuration including the magnetic flux sensor 10 and the diaphragm 201. This configuration is widely applicable to the detection of the amount of powder toner, such as the detection of the toner remaining amount in the developing device 112, for example.

Further, in the above-described example of the embodiment, the powder for which the remaining amount is detected is the toner serving as the developer used in the electrophotographic image forming apparatus 100. However, this example is illustrative. Thus, the detection of the remaining amount of powder is similarly applicable to other powder having flowability and thus affecting the vibration of the diaphragm 201 in accordance with the remaining amount thereof, such as a pre-mixed agent in which toner and carrier are previously mixed, for example. Moreover, the detection of the remaining amount is not limited to powder, and is similarly applicable to any substance having flowability and thus affecting the vibration of the diaphragm 201 in accordance with the remaining amount thereof, such a substance in liquid form.

In the above-described example of the embodiment, the attenuation rate ζ is calculated with the foregoing equation (2). However, this example is illustrative, and the attenuation rate ζ may be the mean of the attenuation rates of a plurality of peak values, as illustrated in the following equation (3):

$$\zeta = \frac{1}{2}\left(\frac{P_4 - P_3}{P_2 - P_1} + \frac{P_8 - P_7}{P_6 - P_5}\right) \quad (3)$$

Further, the attenuation rate ζ may simply be the ratio of peak values, as illustrated in the following equation (4):

$$\zeta = \frac{P_6}{P_2} \quad (4)$$

The above-described example of the embodiment uses the planar pattern coil 11 patterned on a substrate. With the planar pattern coil 11 formed on a flat surface, the thickness of the planar pattern coil 11 in the direction of facing the diaphragm 201 as the subject of sensing is reduced, thereby allowing a reduction in size of the powder detection device.

Figure 29:
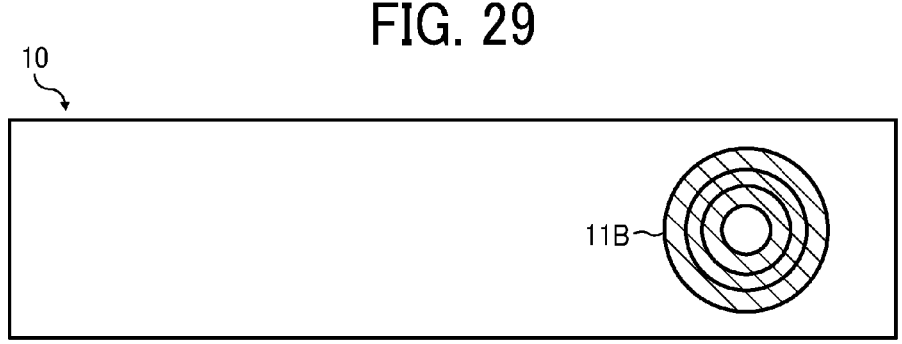
FIG. 29 is a front view illustrating the modified example of the coil of the magnetic flux sensor according to the embodiment.

A similar effect is obtainable by forming a coil to generate a magnetic flux parallel to the direction of facing the diaphragm 201, even if the coil is not formed into a planar pattern. FIGS. 28 and 29 illustrate a modified example of the coil. FIG. 28 is a side view illustrating a coil 11B, as viewed in a direction parallel to a surface of the substrate forming the magnetic flux sensor 10. FIG. 29 is a front view illustrating the coil 11B, as viewed in a direction perpendicular to the surface of the substrate forming the magnetic flux sensor 10.

In the example in FIGS. 28 and 29, a wire having an insulated surface is wound and disposed on the substrate of the magnetic flux 10 to form the coil 11B. Also in the example in FIGS. 28 and 29, the thickness of the coil 11B in the direction parallel to the direction of facing the diaphragm 201 is sufficiently reduced, as illustrated in FIG. 28, allowing a reduction in size of the powder detection device.

Figure 30:
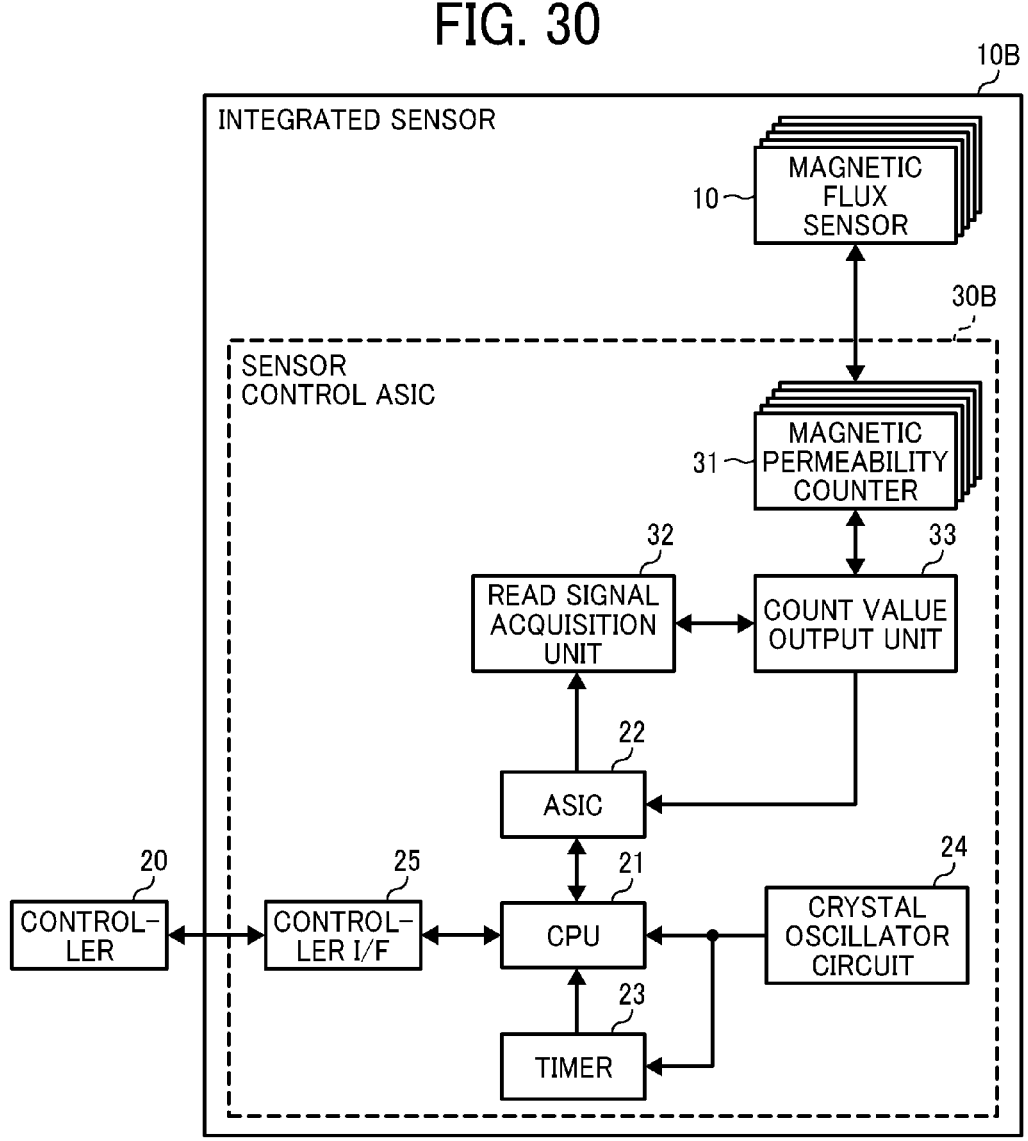
FIG. 30 is a block diagram illustrating a configuration of an integrated sensor according to an embodiment of this disclosure.

In the above-described example of the embodiment, the magnetic flux sensor 10 outputs the oscillation signal, and the controller 20 connected to the higher controller for controlling the image forming apparatus 100 acquires the oscillation signal to perform the detection operations and the determination operations of related units. The embodiment may be modified such that the magnetic flux sensor 10 is integrated with an information processing function for performing some of the determination operations to configure an integrated sensor 10B, and that the controller 20 only acquires the results of the determination operations performed by the integrated sensor 10B, which is installed like the magnetic flux sensor 10 illustrated in FIG. 3. FIG. 30 illustrates such an example.

FIG. 30 is a block diagram illustrating connections between the controller 20 and functional configurations of units in the integrated sensor 10B. As illustrated in FIG. 30, the integrated sensor 10B includes the foregoing magnetic flux sensor 10 and a sensor control ASIC 30B including configurations similar to those included in the input and output control ASIC 30 and the controller 20 described above with FIG. 8.

The sensor control ASIC 30B includes the magnetic permeability counter 31, the read signal acquisition unit 32, the count value output unit 33, the CPU 21, the ASIC 22, the timer 23, the crystal oscillator circuit 24, and a controller interface (I/F) 25. The configurations of the sensor control ASIC 30B other than the controller I/F 25 have similar functions to those of the configurations in FIG. 8 assigned with the same reference numerals.

The controller I/F 25 is an interface for allowing the CPU 21 to exchange information with the controller 20. In this configuration, the operations described above with FIGS. 20 and 24 are executed by the sensor control ASIC 30B, and the determination results obtained from the operations are transmitted to the controller 20 via the controller I/F 25.

Figures 31, 31A:
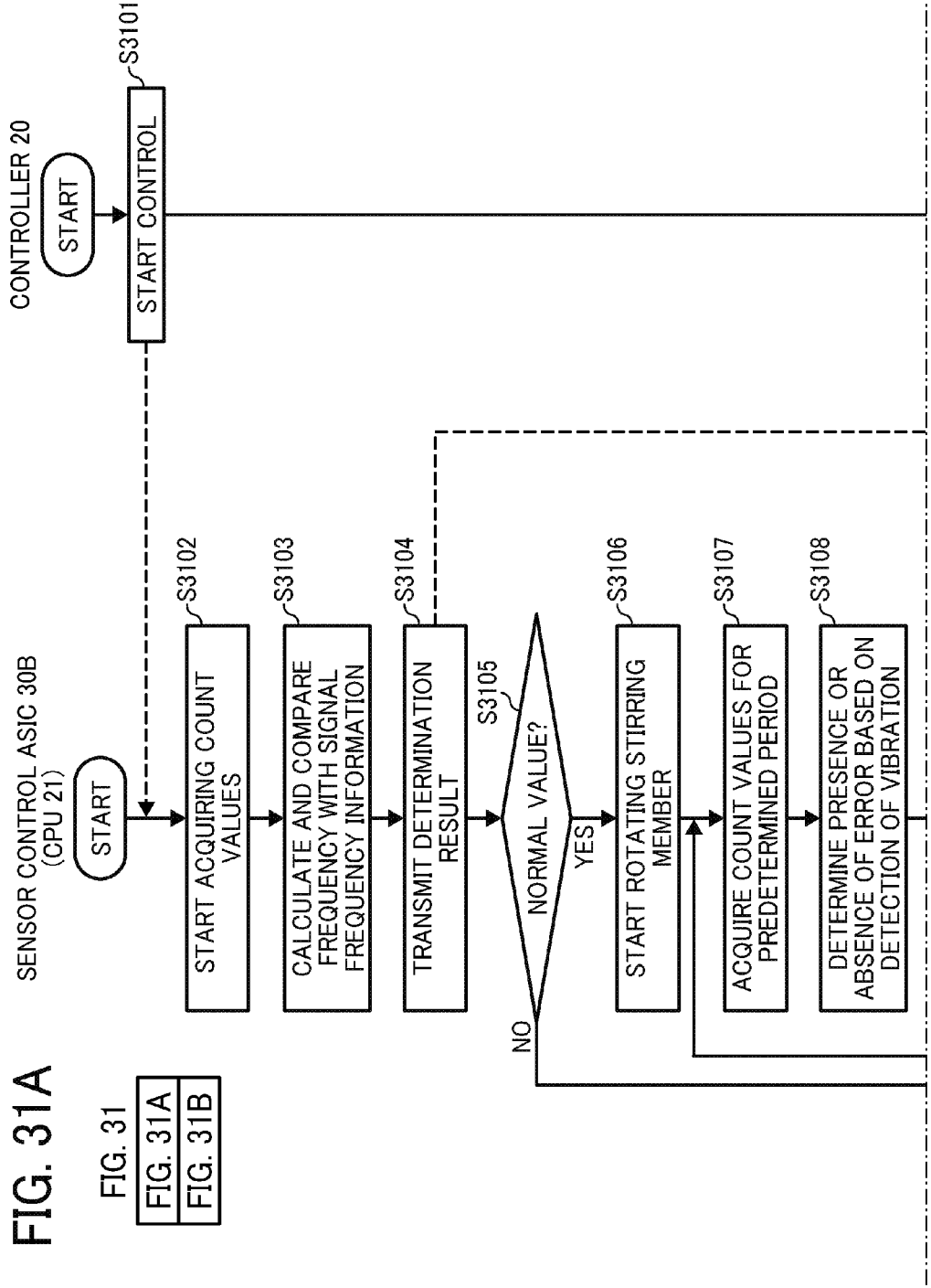
FIGS. 31A and 31B are a flowchart illustrating an error determination operation performed with the integrated sensor according to the embodiment.
Figure 31B:
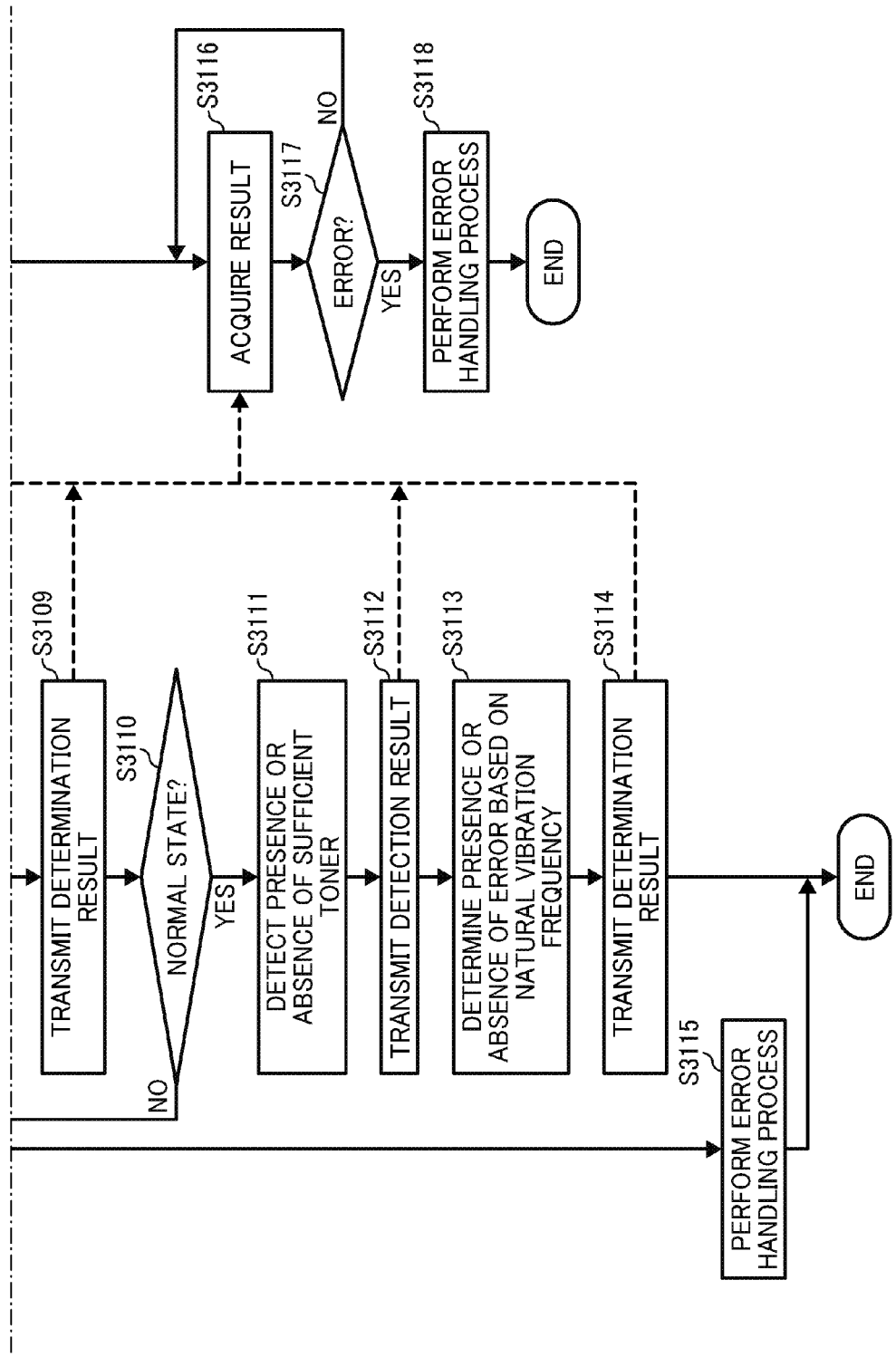

FIGS. 31A and 31B are a flowchart illustrating an operation performed in this case. FIGS. 31A and 31B illustrate an operation of the controller 20 and an operation of the sensor control ASIC 30B. As illustrated in FIGS. 31A and 31B, the controller 20 first causes the sensor control ASIC 30B to start the operation of detecting the toner remaining amount by the magnetic flux sensor 10 (step S3101). This process is executed with a command transmitted to the sensor control ASIC 30B from the controller 20 via the controller I/F 25.

In the sensor control ASIC 30B having received the command to start the detection operation, the CPU 21 starts acquiring count values, similarly as in the process described above with FIG. 24 (step S3102), and performs a process of calculating the oscillation frequency f and comparing the calculated oscillation frequency f with the signal frequency information illustrated in FIG. 25 (step S3103). The CPU 21 determines the presence or absence of an error based on the oscillation frequency f obtained from the process of step S3103, and informs the controller 20 of the determination result via the controller I/F 25 (step S3104).

Thereafter, the CPU 21 executes processes similar to those of steps S2403 to S2406 and S2411 in FIG. 24 (steps S3105 to 3108 and S3115). The CPU 21 then informs the controller 20 of the determination result of the presence or absence of an error based on the detection of the vibration via the controller I/F 25 (step S3109). Since the subsequent processes do not take place until it is confirmed that the diaphragm 201 is vibrating, the CPU 21 repeats the processes from step S3107 (NO at step S3110) until the normal state is determined (YES at step S3110) as a result of the determination of the presence or absence of an error based on the detection of vibration.

If the normal state is determined as a result of the determination of the presence or absence of an error based on the detection of vibration, the CPU 21 executes a process of detecting the presence or absence of sufficient toner similarly as in step S2408 (step S3111), and informs the controller 20 of the detection result via the controller I/F 25 (step S3112). Thereafter, the CPU 21 determines the presence or absence of an error based on the natural vibration frequency similarly as in step S2409 (step S3113), informs the controller 20 of the determination result via the controller I/F 25 (step S3114), and completes the operation.

After having caused the sensor control ASIC 30B to execute the detection operation, the controller 20 acquires the results of the processes at steps S3104, S3109, S3112, and S3114 via the controller I/F 25 (step S3116). At each acquisition of a result, the controller 20 checks whether or not the result indicates an error (step S3117), and repeats the process (NO at step S3117) until an error is detected.

If any of the results of the processes at steps S3104, S3109, S3112, and S3114 indicates an error (YES at step S3117), the controller 20 performs an error handling process in accordance with the type of the error (step S3118), and completes the operation. With the above-described processes, the operation for the example in FIG. 30 is completed. Thus, similar effects as those of the above-described embodiment are also obtainable with the integrated sensor 10B integrated with the sensor control ASIC 30B.

An embodiment of this disclosure accurately detects a shortage of powder remaining in a container, and determines an error of a detection mechanism.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A toner detection device comprising:
 a detection mechanism including:
  a magnetic flux sensor disposed at an outer side of a wall of a container configured to store toner, the magnetic flux sensor configured to output an oscillation signal having a frequency according to a state of a magnetic flux passing through the wall;
  a vibrated member made of a material affecting the magnetic flux, and disposed at an inner side of the wall of the container to face the magnetic flux sensor; and
  a stirring member disposed inside the container configured to rotate to stir the toner, and to contact an end of the vibrated member as the stirring member rotates to vibrate the vibrated member; and
 a detection unit configured to acquire the frequency of the oscillation signal of the magnetic flux sensor at predetermined periods, to detect a vibration of the vibrated member based on a change in the frequency of the oscillation signal, and to detect a remaining amount of the toner in the container based on the vibration of the vibrated member.

2. The toner detection device of claim 1, the detection unit further configured to detect an error of the detection mechanism based on the oscillation signal output by the magnetic flux sensor, and to determine a type of the error based on the frequency of the oscillation signal.

3. The toner detection device of claim 2, wherein the detection unit determines presence or absence of the error of the detection mechanism before starting the detection of the remaining amount of the toner in the container, and
wherein the stirring member starts vibrating the vibrated member after it is determined that the detection mechanism is in a normal state.

4. The toner detection device of claim 1, wherein the detection unit associates a type of error of the detection mechanism with presence or absence of the vibration of the vibrated member, and
wherein the detection unit acquires information of the presence or absence of the vibration of the vibrated member based on the frequency of the oscillation signal and determines the type of the error of the detection mechanism in accordance with the presence or absence of the vibration of the vibrated member.

5. The toner detection device of claim 1, wherein the detection unit associates a type of error of the detection mechanism with a vibration frequency of the vibrated member, and
wherein the detection unit determines the type of the error of the detection mechanism in accordance with the vibration frequency of the vibrated member.

6. The toner detection device of claim 5, wherein the detection unit associates the type of the error of the detection mechanism with a combination of the remaining amount of the toner in the container and the vibration frequency of the vibrated member, and
wherein the detection unit determines the type of the error of the detection mechanism based on the vibration frequency of the vibrated member and the associated detected remaining amount of the toner in the container.

7. An image forming apparatus, comprising:
the toner detection device of claim 1, the detection unit configured to detect a remaining amount of the toner serving as a developer supplied to a developing device for forming electrostatic latent images on a photoconductor.

8. The toner detection device of claim 1, wherein the vibrated member is disposed so as to face the magnetic flux sensor via a housing of a sub-hopper.

9. The toner detection device of claim 1, wherein the detection unit is configured to detect abnormality when the stirring member is stopped.

10. The toner detection device of claim 1, wherein the stirring member flips the vibrated member to periodically vibrate the vibrated member.

11. The toner detection device of claim 1, wherein the vibrated member vibrates with rotation of the stirring member.

12. The toner detection device of claim 1, wherein the magnetic flux sensor includes a planar pattern coil that responds to change in magnetic flux passing through the wall.

13. The toner detection device of claim 1, wherein the detection unit is configured to detect failure in the vibrated member by determining whether a calculated vibration frequency of the vibrated member is in a predetermined frequency range.

14. A method for detecting an amount of toner in a container, the method comprising:
acquiring, at predetermined periods, a frequency of an oscillation signal output by a magnetic flux sensor, wherein the frequency is output according to a state of a magnetic flux passing through a wall of the container, and the magnetic flux sensor disposed at an outer side of the wall of the container;
detecting a vibration of a vibrated member disposed at an inner side of the wall facing the magnetic flux sensor based on a change in the frequency of the oscillation signal; and
detecting a remaining amount of the toner in the container based on the vibration of the vibrated member.

15. The method of claim 14, further comprising:
detecting an error of a detection mechanism including the magnetic flux sensor and the vibrated member based on the oscillation signal output by the magnetic flux sensor; and
determining a type of the error based on the frequency of the oscillation signal.

16. The method of claim 15, wherein the detecting of the error precedes the detecting of the remaining amount of the toner in the container, and
wherein the detecting the vibration starts after it is determined that the detection mechanism is in a normal state.

17. The method of claim 14, further comprising:
associating a type of error of a detection mechanism including the magnetic flux sensor and the vibrated member with presence or absence of the vibration of the vibrated member; and
determining the type of the error of the detection mechanism in accordance with the presence or absence of the vibration of the vibrated member.

18. The method of claim 14, further comprising:
associating a type of error of a detection mechanism including the magnetic flux sensor and the vibrated member with a vibration frequency of the vibrated member; and
determining the type of the error of the detection mechanism in accordance with the vibration frequency of the vibrated member.

19. The method of claim 18, further comprising:
associating the type of the error of the detection mechanism with a combination of the remaining amount of the toner in the container and the vibration frequency of the vibrated member; and
determining the type of the error of the detection mechanism based on the vibration frequency of the vibrated member and the associated detected remaining amount of the toner in the container.

20. A non-transitory recording medium storing a program for causing a computer to execute a method comprising:
acquiring, at predetermined periods, a frequency of an oscillation signal output by a magnetic flux sensor, wherein the frequency is output according to a state of a magnetic flux passing through a wall of a container, and the magnetic flux sensor disposed at an outer side of the wall of the container;

detecting a vibration of a vibrated member disposed at an inner side of the wall facing the magnetic flux sensor based on a change in the frequency of the oscillation signal; and detecting a remaining amount of toner in the container based on the vibration of the vibrated member.

* * * * *